US011159257B2

(12) United States Patent
Douglas et al.

(10) Patent No.: US 11,159,257 B2
(45) Date of Patent: Oct. 26, 2021

(54) WIRELESS ORGANIZATION OF ELECTRICAL DEVICES USING BROADCAST SIGNALS

(71) Applicant: SIGNIFY HOLDING B.V., Eindhoven (NL)

(72) Inventors: Bruce Andrew Carl Douglas, Fayetteville, GA (US); Dominic Pritham, Fairburn, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 30 days.

(21) Appl. No.: 16/547,320

(22) Filed: Aug. 21, 2019

(65) Prior Publication Data

US 2020/0067611 A1    Feb. 27, 2020

Related U.S. Application Data

(60) Provisional application No. 62/720,573, filed on Aug. 21, 2018.

(51) Int. Cl.
| | | |
|---|---|---|
| *H04B 17/327* | (2015.01) | |
| *H04B 17/24* | (2015.01) | |
| *H04W 72/00* | (2009.01) | |
| *H04W 76/11* | (2018.01) | |
| *H04L 1/08* | (2006.01) | |

(52) U.S. Cl.
CPC .......... *H04B 17/327* (2015.01); *H04B 17/24* (2015.01); *H04L 1/08* (2013.01); *H04W 72/005* (2013.01); *H04W 76/11* (2018.02)

(58) Field of Classification Search
CPC ...... H04B 17/327; H04B 17/24; H04B 17/27; H04B 17/382; H04W 72/005; H04W 76/11; H04W 8/005; H04W 84/18; H04L 1/08
See application file for complete search history.

(56) References Cited

U.S. PATENT DOCUMENTS

| | | |
|---|---|---|
| 7,994,723 B2 | 8/2011 | Budde et al. |
| 8,829,821 B2 | 9/2014 | Chobot et al. |
| 9,072,133 B2 | 6/2015 | Chemel et al. |
| 2018/0077546 A1* | 3/2018 | Arunachalam ......... H04L 67/18 |
| 2018/0313944 A1* | 11/2018 | Park ...................... H04W 64/00 |
| 2018/0367947 A1* | 12/2018 | Kim ...................... H04W 4/021 |

* cited by examiner

*Primary Examiner* — Jung H Park

(57) ABSTRACT

A system can include a first electrical device disposed within a volume of space. The system can also include a user system disposed in the volume of space. The user system can broadcast a first initiation signal in the volume of space. The user system can also receive, in response to the first initiation signal, a first response signal from the first transceiver of the first electrical device, where the first response signal includes a first identification of the first electrical device. The user system can further measure at least one parameter associated with the first response signal. The user system can also determine whether the at least one parameter is within a range of acceptable values. The user system can further assign the first electrical device to a first group when the at least one parameter is determined to be within a range of acceptable values.

19 Claims, 13 Drawing Sheets

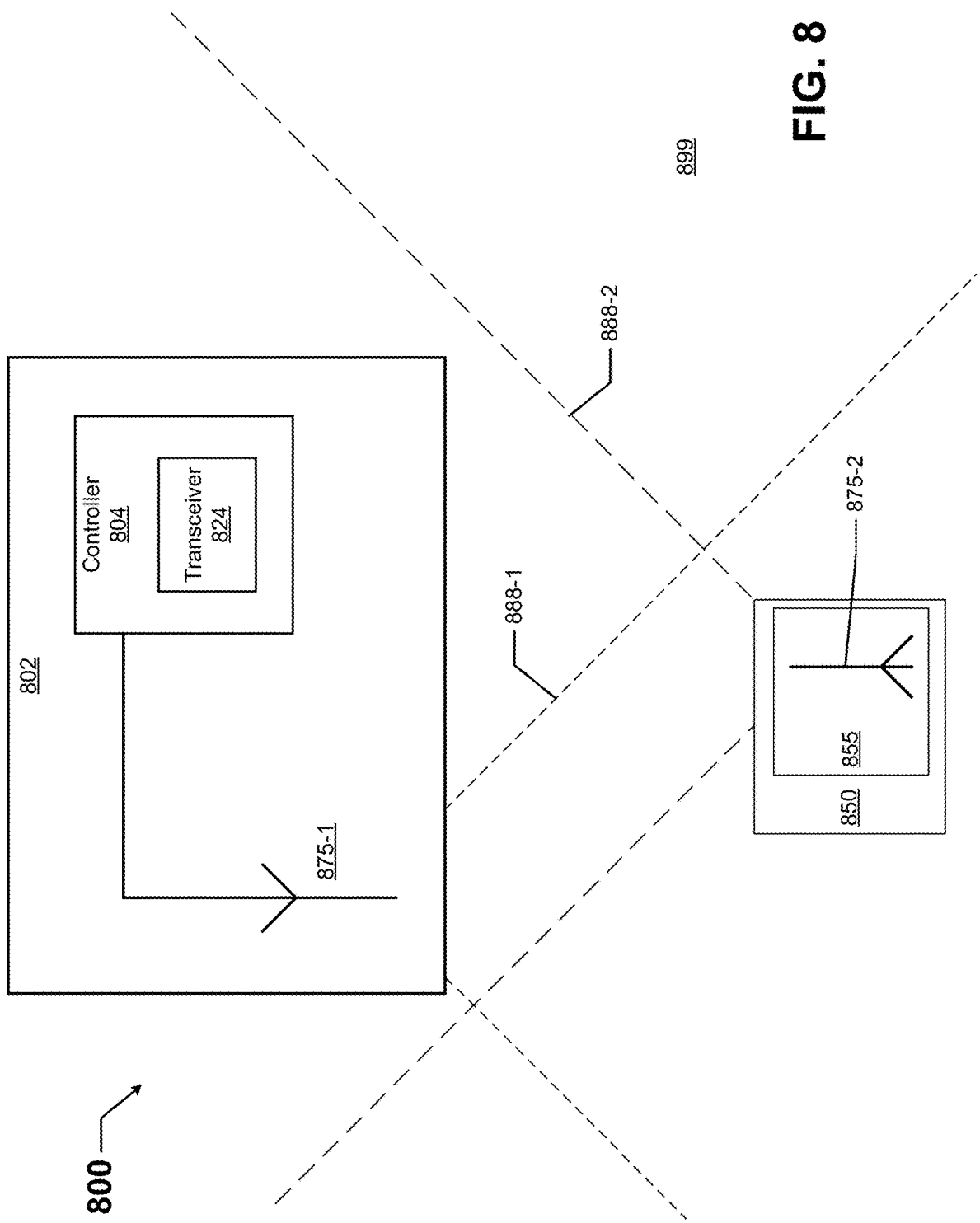

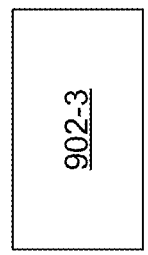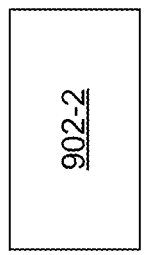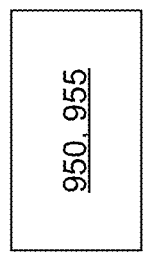
FIG. 9A

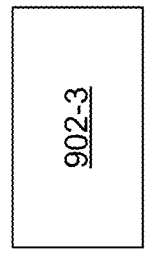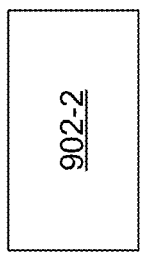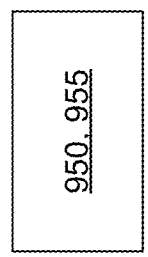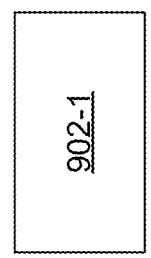
FIG. 9B

US 11,159,257 B2

WIRELESS ORGANIZATION OF ELECTRICAL DEVICES USING BROADCAST SIGNALS

CROSS-REFERENCE TO RELATED APPLICATIONS

This application claims priority under 35 U.S.C. § 119 to U.S. Provisional Patent Application Ser. No. 62/720,573, titled "Wireless Organization of Electrical Devices Using Broadcast Signals" and filed on Aug. 21, 2018, the entire contents of which are hereby incorporated herein by reference.

TECHNICAL FIELD

The present disclosure relates generally to electrical systems, and more particularly to systems, methods, and devices for wirelessly organizing electrical systems into sets.

BACKGROUND

In an office space or other environment within a building, a number of electrical devices (e.g., light fixtures, printers, wall outlets) are spread throughout the area. Some of these electrical devices can share one or more characteristics. For example, some electrical devices can all be light fixtures. As another example, some electrical devices can be located in a common volume of space. Organizing electrical devices by one or more of these characteristics can be useful.

SUMMARY

In general, in one aspect, the disclosure relates to a system that includes a first electrical device disposed within a volume of space. The system can also include a user system disposed in the volume of space. The user system can broadcast a first initiation signal in the volume of space. The user system can also receive, in response to the first initiation signal, a first response signal from a first transceiver of the first electrical device, where the first response signal includes a first identification of the first electrical device. The user system can further measure at least one parameter associated with the first response signal. The user system can also determine whether the at least one parameter of the first response signal is within a range of acceptable values. The user system can further assign the first electrical device to a first group when the at least one parameter of the first response signal is determined to be within a range of acceptable values.

In another aspect, the disclosure can generally relate to a device for assigning electrical devices to a group. The device can include a user interface and a transceiver. The device can also include controller communicably coupled to the user interface and the transceiver, where the controller is configured to broadcast a first initiation signal in the volume of space. The user interface can also be configured to receive, in response to the first initiation signal, at least one response signal from at least one electrical device, where each of the at least one response signal includes an identification of an electrical device. The user interface can further be configured to measure at least one parameter associated with each of the at least one response signal. The user interface can also be configured to determine whether the at least one parameter of each of the at least one response signal is within a range of acceptable values. The user interface can further be configured to assign each of the at least one electrical device to a first group when the at least one parameter of the response signal sent by the at least one electrical device is determined to be within a range of acceptable values. The user interface can also be configured to send a plurality of communication signals to a gateway, where the plurality of communication signals includes information about the at least one electrical device assigned to the first group.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 8 shows a system for transceiving communication signals in a volume of space in accordance with certain example embodiments.

FIGS. 9A and 9B show a side and top view, respectively, of a system in which a user device is located in a volume of space in accordance with certain example embodiments.

DETAILED DESCRIPTION

Figure 1:
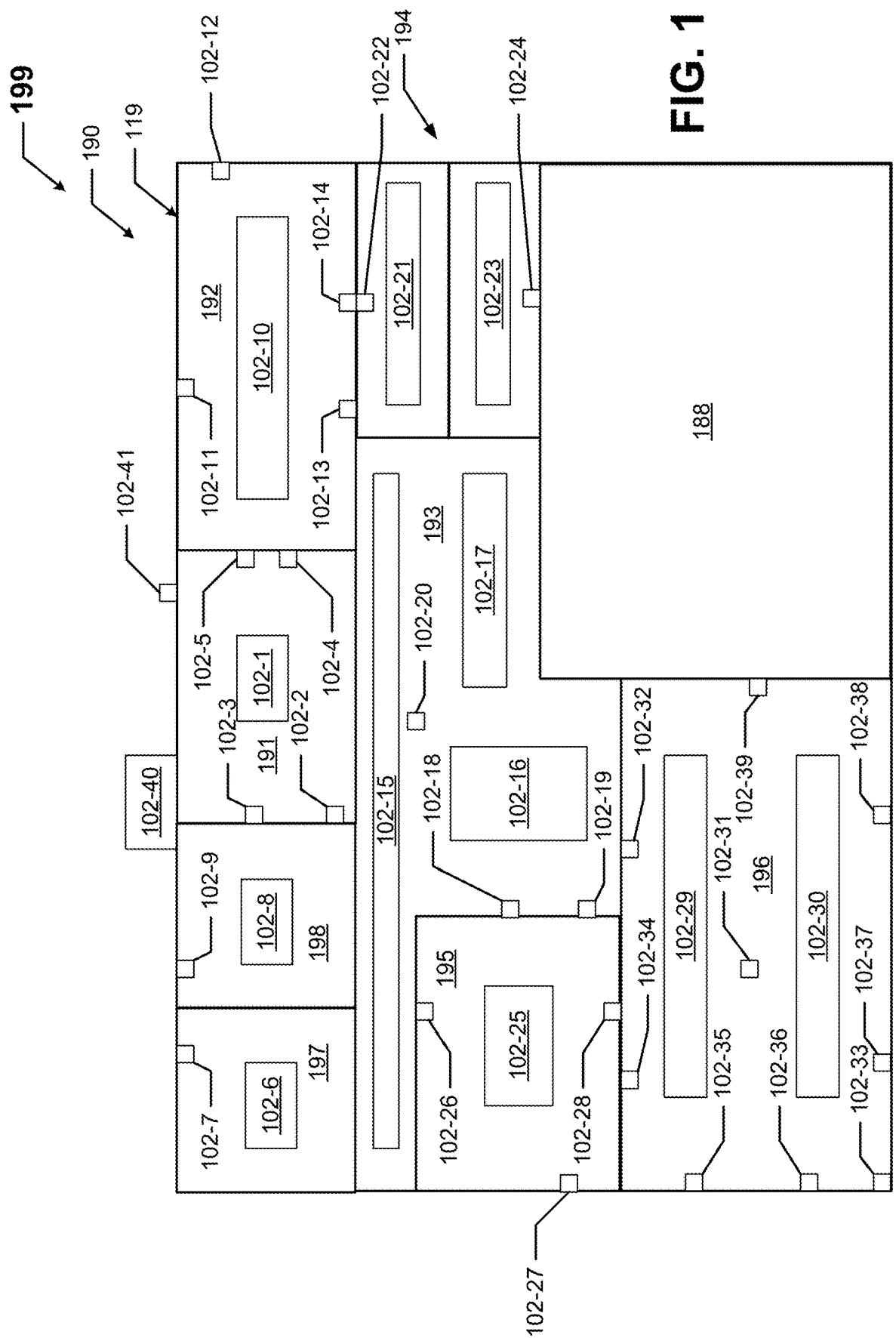
FIG. 1 shows a volume of space having multiple electrical devices in accordance with certain example embodiments.

In general, example embodiments provide systems, methods, and devices for wireless organization of electrical devices using broadcast signals. Example embodiments can provide a number of benefits. Such benefits can include, but are not limited to, efficient commissioning, ease in grouping of electrical devices used for a common purpose or having common settings, effective energy management of light fixtures and other devices in a space, improved safety, longer useful life of light fixtures and other electrical equipment in a room, reduced operating costs, and compliance with industry standards that apply to light fixtures and other electrical equipment in certain environments.

Example embodiments are directed to wirelessly organizing any of a number of different types of electrical devices. Examples of such electrical devices can include, but are not limited to, a light fixture, a wall outlet, a computer, a printer, an automated window covering (e.g., blinds, drapes), a projector, a control panel, an automated window tinting mechanism, a HVAC system (including, for example, a vent and a thermostat), a camera, a sensor device, a smoke detector, a CO2 monitor, a clock, and a telephone.

Further, while example embodiments are described, by way of example herein, as being used in a building, example embodiments can also be used in other areas where electrical devices can be located. Such other areas can include, but are not limited to, a parking structure, a parking lot, a street, an outdoor stadium, and a park. Further, when applied to building environments, example embodiments can be used in any part of such building environments. Such parts of a building environment can include, but are not limited to, a small room (individual office, small conference room), a large room (large conference room, an auditorium, an exhibit hall), a break room, bathrooms, locker rooms, a corridor, a stairwell, an auditorium, a server room, an attic, a basement, a warehouse, a museum, a maintenance area, a manufacturing space, a shop floor, a storage room, an inventory space, and an arena.

When an electrical device is a light fixture, the light fixture can use any type of light source (e.g., light-emitting diode (LED), incandescent, sodium vapor, fluorescent, hologen). When light sources use LED technology, one or more of any type of LED technology can be included, such as chip-on-board, discrete, arrays, and multicolor.

In the foregoing figures showing example embodiments of wireless organization of electrical devices using broadcast signals, one or more of the components shown may be omitted, repeated, and/or substituted. Accordingly, example embodiments of wireless organization of electrical devices using broadcast signals should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, light fixtures and/or other electrical equipment used in wireless organization herein are subject to meeting certain standards and/or requirements. For example, the National Electric Code (NEC), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the enclosures of electrical devices described herein.

Example embodiments of wireless organization of electrical devices using broadcast signals will be described more fully hereinafter with reference to the accompanying drawings, in which example embodiments of wireless organization of electrical devices using broadcast signals are shown. Wireless organization of electrical devices using broadcast signals may, however, be embodied in many different forms and should not be construed as limited to the example embodiments set forth herein. Rather, these example embodiments are provided so that this disclosure will be thorough and complete, and will fully convey the scope of wireless organization of electrical devices using broadcast signals to those of ordinary skill in the art. Like, but not necessarily the same, elements (also sometimes called components) in the various figures are denoted by like reference numerals for consistency.

Terms such as "first", "second", "third", and "within" are used merely to distinguish one component (or part of a component or state of a component) from another. Such terms are not meant to denote a preference or a particular orientation. Such terms are not meant to limit embodiments of wireless organization of electrical devices using broadcast signals. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
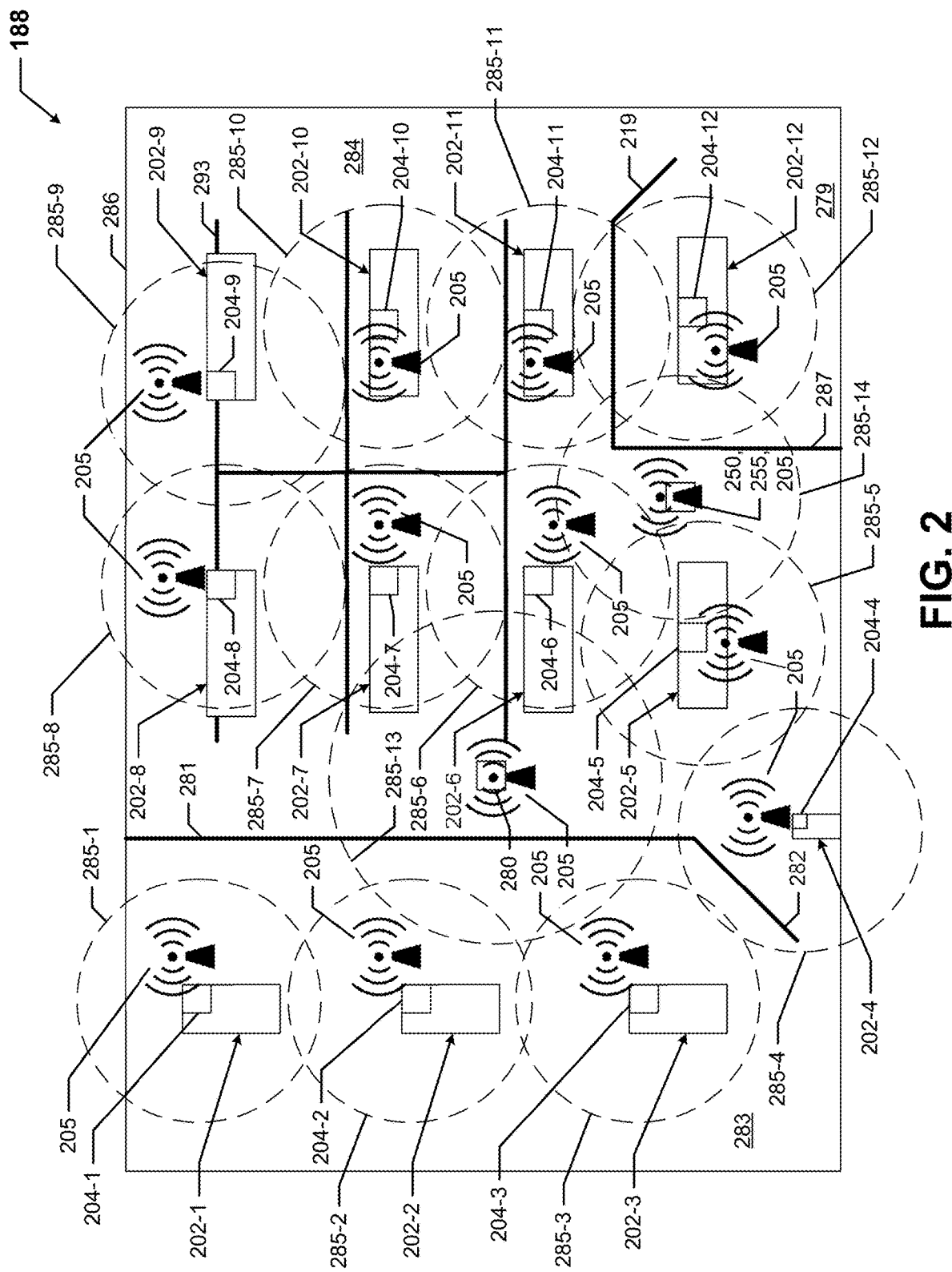
FIG. 2 shows a detail of part of the office space of FIG. 1.

FIG. 1 shows a volume of space 199 that includes multiple electrical devices 102 an office space 199 inside a building 190 in accordance with certain example embodiments. FIG. 2 shows a detail of the work area 188 of part of the office space 119 of FIG. 1. The office space 119 includes a number of adjoining rooms. In this case, the office space 199 shown in FIG. 1 includes a reception area 191 that is adjoining to a hallway 193. The hallway 193 leads to restrooms 194, a large office 192, two smaller offices 197 and 198, a conference room 196, a break room 195, and a work area 188.

The work area 188, as shown in FIG. 2, is defined by exterior walls 286 that form the outer perimeter of the work area 188. The work area 188 is divided into a number of areas. For example, a wall 281 and a door 282 separate a hallway 283 from a work space 284. As another example, wall 287 and door 219 define an office 279 within the work area 188 and separate from the work space 284. The work space 284, the hallway 283, and the office 286 are examples of zones that can be created using example embodiments. The parking lot 189, shown in FIG. 1 and part of the volume of space 199, is located outside the office space 119 adjacent to the reception area 191.

Each room of the office space 119 includes one or more of a number of electrical devices 102, 202. The electrical devices 102, 202 shown in FIGS. 1 and 2 are not exclusive and are not meant to be limiting in terms of the number and/or type of electrical devices 102, 202 that can be found in the office space 119. In this case, the reception area 191 includes an electrical device 102-1 in the form of a light fixture, an electrical device 102-2 in the form of a thermostat, two electrical devices 102 (electrical device 102-3 and electrical device 102-4) in the form of electrical receptacles, and an electrical device 102-5 in the form of a security camera. The office 197 in this example includes an electrical device 102-6 in the form of a light fixture and an electrical device 102-7 in the form of an electrical outlet. The office 198 in this example includes an electrical device 102-8 in the form of a light fixture and an electrical device 102-9 in the form of an electrical outlet. The office 192 includes an electrical device 102-10 in the form of a light fixture, three electrical devices 102 (electrical device 102-11, electrical device 102-12, and electrical device 102-14) in the form of electrical outlets, and an electrical device 102-13 in the form of a thermostat.

The hallway 193 in FIG. 1 includes three electrical devices 102 (electrical device 102-15, electrical device 102-16, and electrical device 102-17) in the form of light fixtures, an electrical device 102-18 in the form of an electrical outlet, an electrical device 102-19 in the form of a thermostat, and an electrical device 102-20 in the form of a security camera. The restrooms 194 in this example include two electrical devices (electrical device 102-21 and electrical device 102-23) in the form of light fixtures and two electrical devices 102 (electrical device 102-22 and electrical device 102-24) in the form of electrical outlets. The break room 195 in FIG. 1 includes an electrical device 102-25 in the form of a light fixture and three electrical devices 102 (electrical device 102-26, electrical device 102-27, and electrical device 102-28) in the form of electrical outlets.

The conference room 196 in this example includes two electrical devices 102 (electrical device 102-29 and electrical device 102-30) in the form of light fixtures, an electrical device 102-32 in the form of a thermostat, an electrical device 102-31 in the form of a projector, an electrical device 102-33 in the form of a security camera, and six electrical devices 102 (electrical device 102-34, electrical device 102-35, electrical device 102-36, electrical device 102-37, electrical device 102-38, and electrical device 102-39) in the form of electrical outlets. There can also be one or more electrical devices 102 located outside the building 190. For example, as shown in FIG. 1, there can be an electrical device 102-40 in the form of a light fixture and an electrical device 102-41 in the form of a security camera located near the entrance to the reception area 191.

As shown in FIG. 2, the hallway 283 of the work area 188 includes three electrical devices 202 (electrical device 202-1, electrical device 202-2, and electrical device 202-3) in the form of light fixtures. The office 286 of the work space 284 of FIG. 2 includes an electrical device 202-12 in the form of a light fixture. The work space 284 of the work area 188 of FIG. 2 includes an electrical device 202-4 in the form of an illuminated exit sign (a form of light fixture) and seven electrical devices 202 (electrical device 202-5, electrical device 202-6, electrical device 202-7, electrical device 202-8, electrical device 202-9, electrical device 202-10, and electrical device 202-11) in the form of light fixtures. Also located in the work space 284 is a gateway 280 and a user 250 with a user system 255, all of which are described below with respect to FIG. 3.

Each of electrical device 202-1 through electrical device 202-12 in the work area 188 of FIG. 2 includes a controller 204. Further, each controller 204 includes a transceiver (such as transceiver 324 described below with respect to FIG. 3), and each transceiver in this example transmits and receives signals (e.g., signals 376 of FIG. 3 below). The user system 255 and the gateway 280 can also include a controller with a transceiver for transmitting signals using communication links 205. These signals are transmitted using the communication links 205 (also defined below with respect to FIG. 3) by which the electrical devices 202, the user system 250, and the gateway 280 communicate with each other. Each transceiver has a range 285 (e.g., 10 meters) that defines a maximum area or volume of space in which the transceiver can send and receive signals.

For example, electrical device 202-1 includes a controller 204-1, where the transceiver of the controller 204-1 has a communication range 285-1. Electrical device 202-2 includes a controller 204-2, where the transceiver of the controller 204-2 has a communication range 285-2. Electrical device 202-3 includes a controller 204-3, where the transceiver of the controller 204-3 has a communication range 285-3. Electrical device 202-4 includes a controller 204-4, where the transceiver of the controller 204-4 has a communication range 285-4. Electrical device 202-5 includes a controller 204-5, where the transceiver of the controller 204-5 has a communication range 285-5.

Electrical device 202-6 includes a controller 204-6, where the transceiver of the controller 204-6 has a communication range 285-6. Electrical device 202-7 includes a controller 204-7, where the transceiver of the controller 204-7 has a communication range 285-7. Electrical device 202-8 includes a controller 204-8, where the transceiver of the controller 204-8 has a communication range 285-8. Electrical device 202-9 includes a controller 204-9, where the transceiver of the controller 204-9 has a communication range 285-9. Electrical device 202-10 includes a controller 204-10, where the transceiver of the controller 204-10 has a communication range 285-10.

Electrical device 202-11 includes a controller 204-11, where the transceiver of the controller 204-11 has a communication range 285-11. Electrical device 202-12 includes a controller 204-12, where the transceiver of the controller 204-12 has a communication range 285-12. The transceiver of the gateway 280 has a communication range 285-13. Finally, the user system 255 of the user 250 has a communication range 285-14. While not shown in FIG. 2 to simplify the figure, to the extent that there are other electrical devices 202 (e.g., electrical outlets, cameras, projectors) in the work area 188, they can also include a controller with a transceiver, where the transceiver has a communication range 285.

A transceiver of an electrical device 202, the user system 255, and/or the gateway 280 can communicate with a transceiver of another electrical device 202, the user system 255, and/or the gateway 280 if the communication range 285 of one transceiver intersects the communication range 285 of another transceiver. In this example, communication range 285-1 intersects communication range 285-2, which intersects communication range 285-3, which intersects communication range 285-4, which intersects communication range 285-5, which intersects range 285-6, which intersects range 285-7, which intersects communication range 285-8, which intersects communication range 285-9, which intersects communication range 285-10, which intersects communication range 285-11, which intersects communication range 285-12. In other words, the controllers 204 of the electrical devices 202 shown in FIG. 2 are communicably coupled to each other in a daisy-chain configuration. In other embodiments, the range 285 of the transceiver of one electrical device 202 can intersect with more than two communication ranges 285 of the transceivers of one or more other electrical device 202.

Further, the communication range 285-13 of the gateway 280 intersects with the range communication 285-2 of electrical device 202-2, the range communication 285-3 of electrical device 202-3, the range communication 285-5 of electrical device 202-5, the communication range 285-6 of electrical device 202-6, and the communication range 285-7 of electrical device 202-7. In addition, the communication range 285-14 of the user system 255 in this example intersects with the communication range 285-5 of electrical device 202-5, the communication range 285-6 of electrical device 202-6, the communication range 285-12 of electrical device 202-12, and the communication range 285-12 of electrical device 202-12. These communication ranges 285 of a device (e.g., the user system 255) can similarly be expanded or reduced to increase or decrease the number of other electrical devices that are in direct communication.

In this example, if the user system 255 broadcasts an initiation signal (e.g., signal 376 discussed below with respect to FIG. 3), only electrical device 202-5, electrical device 202-6, electrical device 202-11, and electrical device 202-12 receive that initiation signal because those are the only electrical devices 202 that are within the communication range 285-14 of the user system 255. In certain example embodiments, when electrical device 202-5, electrical device 202-6, electrical device 202-11, and electrical device 202-12 receive that initiation signal, each of those electrical devices 202 send a response signal (e.g., response signal 377 discussed below with respect to FIG. 3). The user system 255 receives each of the response signals and measures a parameter (e.g., RSSI value, angle of arrival (AoA), angle of departure (AoD)) associated with each of those response signals. When the measured parameter of the response signals is the RSSI value, example embodiments use Received Signal Strength Indication (RSSI) technology.

According to certain example embodiments described herein, the user system 255 can be activated to broadcast initiation signals multiple times, each from a different location, in an effort to assign additional electrical devices 202 to the same group or zone, or to different groups or zones. For example, if the user 250 wants all of the electrical devices 102 in the conference room 196 assigned to a single group, and if the communication range 285 of the user system 255 is too small to reach all of the electrical devices 102 in the conference room 196 at one time, the user 250 can activate the user system 255 to broadcast an initiation signal in multiple locations within the conference room 196. After broadcasting each initiation signal, the electrical devices 102 within range of the initiation signal sends a response signal, which is received by the user system 255.

For the sake of simplicity with respect to FIG. 1, each electrical device 102 can include a controller and a transceiver having a communication range. In this way, all of the electrical devices 102, 202 inside and/or outside the building 190 can be directly or indirectly in communication with each other and with the gateway 180. Also, if a user system 255 is present, then the user system 255 can be in direct or indirect communication with each electrical device 102, 202 and the gateway 280 in the volume of space 199. As explained below with respect to FIG. 3, the communication links (e.g., communication links 205) used in this communication can use wired and/or wireless technology.

Figure 3:
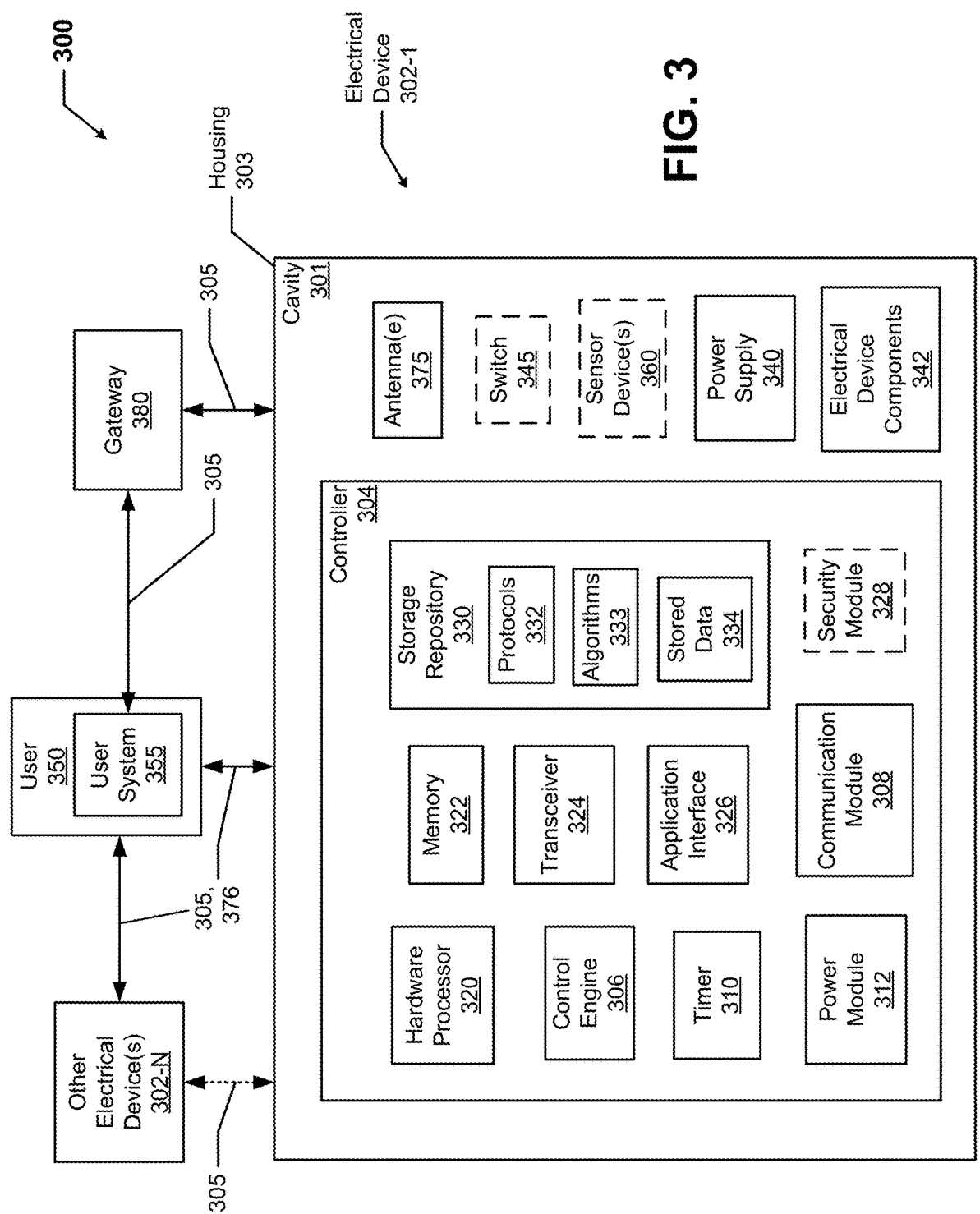
FIG. 3 shows a system in accordance with certain example embodiments.

FIG. 3 shows a system diagram of a system 300 in accordance with certain example embodiments. The system 300 can include one or more users 350 (which can include one or more user systems 355), a gateway 380, an electrical device 302-1, and one or more other optional electrical devices 302-N. The electrical device 302-1 can include one or more of a number of components. For example, as shown in FIG. 3, the electrical device 302-1 can includes a controller 304, a power supply 340, a number of electrical device components 342, one or more antennae 175, one or more optional switches 145, and one or more optional sensors 360.

The controller 304 can include one or more of a number of components. Such components, can include, but are not limited to, a control engine 306, a communication module 308, a timer 310, a power module 312, a storage repository 330, a hardware processor 320, a memory 322, a transceiver 324, an application interface 326, and, optionally, a security module 328. The components shown in FIG. 3 are not exhaustive, and in some embodiments, one or more of the components shown in FIG. 3 may not be included in an example electrical device. Any component of the example electrical device 302-1 can be discrete or combined with one or more other components of the electrical device 302-1. The electrical device 302-1 and the other electrical devices 302-N can collectively be referred to herein as the electrical devices 302.

Referring to FIGS. 1 through 3, a user 350 may be any person that interacts with the electrical devices 302. Examples of a user 350 can include, but are not limited to, an employee, a supervisor, a visitor, an engineer, an electrician, an instrumentation and controls technician, a mechanic, an operator, a consultant, a commissioner, a janitor, a vendor, a manager, a contractor, and a manufacturer's representative. The user 350 can include a user system 355 (also sometimes called a user device 355 herein), which can include a user interface (e.g., a button), an optional display (e.g., a GUI) and/or an optional controller, such as the controller 304 of the electrical device 302-1 described below. Examples of a user system 355 can include, but are not limited to, a remote control, a hand-held transmitter, a personal computer (PC), a laptop, and a mobile phone. An example of a user system 355 is described below with respect to FIG. 12.

The user system 355 can also include software (e.g., an app, a program) that allows a user 350 to establish zones, groups, or other designations for multiple electrical devices 302 in the system 300. For example, the software on the user system 355 can allow a user 350 to have all electrical devices 302 in a volume of space (e.g., the conference room 196) that receive a signal 376 broadcast by the user system 355 to be assigned to a group for some purpose (e.g., designate times when the electrical devices 302 in the group can receive power, upload common settings for the electrical devices 302 in the group). Alternatively, such software can be included with the gateway 380.

In certain example embodiments, a user system 355 is used to establish (e.g., by broadcasting initiation signals 376 and subsequently receiving and evaluating response signals 377) the electrical devices 302 assigned to one or more groups, and the user system 355 subsequently sends, directly or indirectly, through multiple communication signals 378, information about the established groups to the gateway 380. In such a case, the gateway 380 can manage the commissioning and/or operations of the electrical devices 302 in each of the established groups. Communication signals 378 between the gateway 380 and a user device 355 can include, but are not limited to, information about response signals 377 associated with electrical devices 302, group assignments (including changes thereto) for electrical devices 302, commissioning settings and results for electrical devices 302, and operating settings for electrical devices 302. The software (e.g., an app) on a user device 355 can be considered an extension of the gateway 380 and its functionality.

As discussed above, the electrical devices 302 that are assigned to a group can be so designated by broadcasting, from a user system 355, one or more initiation signals 376 that are received by those electrical devices 302 and subsequently receiving and processing one or more response signals 377 from each of those electrical devices 302. An initiation signal 376 can request a response signal 377 from any electrical device 302 that receives the initiation signal 376. The initiation signal 376 can include an identification (e.g., a UUID) of the user system 355 sending the initiation signal 376.

In addition to generating and broadcasting initiation signals 376, a user system 355 can be configured to receive and interpret one or more response signals 377 from one or more electrical devices 302. Further, a user system 355 can be configured to communicate with one or more electrical devices 302 and/or the gateway using communication signals 378. The initiation signals 376, the response signals 377, and the communication signals 378 are transmitted using the communication links 305.

In some cases, the user system 355 of the user 350 can also interact with (e.g., sends data to, receives data from) the controller 304 of the electrical device 302-1 via the application interface 326 (described below) using communication links 305. The user system 355 of the user 350 can also interact with one or more other electrical devices 302-N and/or the gateway 380 using communication links 305. These communications that are not initiation signals 376 or response signals 377 can be called communication signals 378.

All of these interactions between the user system 355, the electrical device 302-1, the other electrical devices 302-N, and the gateway 380 is conducted using communication links 305. Each communication link 305 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a communication link 305 can be (or include) one or more electrical conductors that are coupled to an antenna 375.

A communication link 305 can transmit communication signals 378 (e.g., power signals, control signals, data), initiation signals 376, and response signals 377 between the controller 304, the user system 255, the gateway 380, and/or the controllers of other electrical devices 302-N. One or more communication links 305 can also transmit signals between components (e.g., power module 312, control engine 306, storage repository 330) within the controller 304 and/or more broadly within the electrical device 302-1.

The gateway 380 is a device or component that controls all or a portion of the system 300, which can include the controller 304 of the electrical device 302-1, the user system 355 of the user 350, and the other electrical devices 302-N that are communicably coupled to the gateway 380. The gateway 380 can be substantially similar to, or include some or all of the components of, the controller 304. Alternatively, the gateway 380 can include one or more of a number of features in addition to, or altered from, the features of the controller 304 described below. As described herein, communication with the gateway 380 can include communicating with one or more other components (e.g., another electrical device 302-N) of the system 300. In such a case, the gateway 380 can facilitate such communication. The gateway 380 can be called by any of a number of other names, including but not limited to a network manager, a master controller, and a system manager.

The other electrical devices 302-N are part of the system 300 with the electrical device 302-1. Each of the other electrical devices 302-N can be substantially the same as the electrical device 302-1 described herein. For example, one of the other electrical devices 302-N can include a controller 304. One or more components of the electrical device 302-1 can be shared with one or more of the other electrical devices 302-N. For example, the controller 304 of the electrical device 302-1 can also control some or all of the other electrical devices 302-N. One of the other electrical devices 302-N can be the same as (e.g., in terms of functionality, in terms of components), or different than, one or more of those other electrical devices 302-N.

The electrical device 302-1 can include one or more optional sensor devices 360. A sensor device 360 can include a sensor and one or more other components. Each sensor of a sensor device 360 can measure one or more parameters. The parameters measured by a sensor of a sensor device 360 may or may not directly affect the operation of the electrical device 302-1 or the other electrical devices 302-N. The parameters can include, but are not limited to, a strength of a signal (e.g., communication signal 378), pressure, temperature, carbon monoxide, ambient light, sound, motion, carbon dioxide, smoke, and humidity.

Examples of types of sensor devices 360 can include, but are not limited to, a passive infrared sensor, a photocell, a differential pressure sensor, a signal strength indicator, a humidity sensor, a pressure sensor, an air flow monitor, a gas detector, a vibration sensor, and a resistance temperature detector. Each sensor device 360 can use one or more of a number of communication protocols. A sensor device 360 can be associated with the electrical device 302-1 and/or one or more other electrical devices 302-N in the system 300. In addition to at least one sensor, a sensor device 360 can include one or more of a number of components. For example, a sensor device 360 can include a controller (or components thereof) that is substantially similar to the controller 304 (or components thereof) of the electrical device 302-1, as described below. For example, if a sensor device 360 has communication capabilities, then the sensor device 360 can use one or more of a number of communication protocols. A sensor device 360 can be associated with the electrical device 302-1 and/or one or more other electrical devices 302-N in the system 300.

A user system 355 of a user 350, the gateway 380, the other electrical devices 302-N, and/or the optional sensor devices 360 can interact with the controller 304 of the electrical device 302-1 using the application interface 326 in accordance with one or more example embodiments. Specifically, the application interface 326 of the controller 304 receives data (e.g., information, communications, instructions, updates to firmware) from and sends data (e.g., information, communications, instructions) to a user system 355 of a user 350, the gateway 380, the other electrical devices 302-N, and/or each optional sensor device 360. A user system 355 of a user 350, the gateway 380, the other electrical devices 302-N, and/or each optional sensor device 360 can include an interface to receive data from and send data to the controller 304 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 304, a user system 355 of a user 350, the gateway 380, the other electrical devices 302-N, and/or the optional sensor devices 360 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 304. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 4.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 300.

The electrical device 302-1 can include a housing 303. The housing 303 can include at least one wall that forms a cavity 301. In some cases, the housing 303 can be designed to comply with any applicable standards so that the electrical device 302-1 can be located in a particular environment. The housing 303 can take any form suitable for the electrical device 302-1. For example, when the electrical device 302-1 is a light fixture, the housing 303 can form any type of light fixture, including but not limited to a troffer light fixture, a down can light fixture, a recessed light fixture, and a pendant light fixture. When the electrical device 302-1 is multi-functional, the housing 303 can be configured to combine those functions. For example, the electrical device 302-1 can be a ceiling fan with a light. As another example, the electrical device 302-1 can be a garage door opener with a light.

The housing 303 of the electrical device 302-1 can be used to house one or more components of the electrical device 302-1, including one or more components of the controller 304. For example, as shown in FIG. 3, the controller 304 (which in this case includes the control engine 306, the communication module 308, the timer 310, the power module 312, the storage repository 330, the hardware processor 320, the memory 322, the transceiver 324, the application interface 326, and the optional security module 328), the power supply 340, the electrical device components 342, the antennae 375, the optional switches 145, and the optional sensor devices 360 are disposed in the cavity 301 formed by the housing 303. In alternative embodiments, any one or more of these or other components (e.g., an antenna 375, a sensor device 360) of the electrical device 302-1 can be disposed on the housing 303 and/or remotely from the housing 303.

The storage repository 330 can be a persistent storage device (or set of devices) that stores software and data used to assist the controller 304 in communicating with a user system 355 of a user 350, the gateway 380, the other electrical devices 302-N, and one or more optional sensor devices 360 within the system 300. In one or more example embodiments, the storage repository 330 stores one or more protocols 332, algorithms 333, and stored data 334. The protocols 332 can be one or more of any number of procedures (e.g., a series of method steps) and/or other similar operational procedures that the control engine 306 of the controller 304 follows based on certain conditions at a point in time.

The protocols 332 can include one or more protocols used for communication. The protocols 332 used for communication can be used to send and/or receive data between the controller 304 and a user system 355 of a user 350, the gateway 380, a sensor device 360, and/or the other electrical devices 302-N. One or more of the protocols 332 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 332 used for communication can provide a layer of security to the data transferred within the system 300.

An example of a protocol 332 is receiving an initiation signal 376 broadcast by a user system 355. In such a case, a protocol 332 can require the control engine 306 to initiate a communication signal 378 with the gateway 380 about the initiation signal 376 received. In addition, or in the alternative, a protocol 332 can direct the control engine 306 generate and send a response signal 377 back to the user device 355. Another example of a protocol 332 is using the control engine 306, with instructions from the gateway 380 and/or a user device 355, to assign the electrical device 302-1 into a virtual zone or group in response to the initiation signal 376 and subsequent response signal 377.

Still another example of a protocol 332 is to check one or more communication links 305 with the gateway 380 and, if a communication link 305 is not functioning properly, allow the controller 304 to operate autonomously from the rest of the system 300. As another example of a protocol 332, configurations of the controller 304 can be stored in memory 322 (e.g., non-volatile memory) so that the controller 304 (or portions thereof) can operate regardless of whether the controller 304 is communicating with the gateway 380 and/or other components in the system 300. Yet another example of a protocol 332 is to have the controller 304 operate in an autonomous control mode if one or more components (e.g., the communication module 308, the transceiver 324) of the controller 304 that allows the controller 304 to communicate with another component of the system 300 fails.

The algorithms 333 can be any models, formulas, and/or other similar operational implementations that the control engine 306 of the controller 304 uses. An algorithm 333 can at times be used in conjunction with one or more protocols 332. Stored data 334 can be any historical, present, and/or forecast data. Stored data 334 can be associated with an antenna 175, an optional switch 145, any electrical device components 342, the power supply 340, the controller 304, the gateway 380, a sensor device 360, and a user system 355 of a user 350. Such stored data 334 can include, but is not limited to, settings, threshold values of a parameter of a response signal 377, acceptable values of a parameter of a response signal 377, default values, user preferences, results of an algorithm, capabilities of a light source, and configuration of the antennae 375.

Examples of a storage repository 330 can include, but are not limited to, a database (or a number of databases), a file system, a hard drive, flash memory, some other form of solid state data storage, cloud-based storage, some other form of storage, or any suitable combination thereof. The storage repository 330 can be located on multiple physical machines, each storing all or a portion of the protocols 332, the algorithms 333, and/or the stored data 334 according to some example embodiments. Each storage unit or device can be physically located in the same or in a different geographic location.

The storage repository 330 can be operatively connected to the control engine 306. In one or more example embodiments, the control engine 306 includes functionality to communicate with a user system 355 of a user 350, the gateway 380, a sensor device 360, and the other electrical devices 302-N in the system 300. More specifically, the control engine 306 sends information to and/or receives information from the storage repository 330 in order to communicate with a user system 355 of a user 350, the gateway 380, a sensor device 360, and the other electrical devices 302-N. As discussed below, the storage repository 330 can also be operatively connected to the communication module 308 in certain example embodiments.

In certain example embodiments, the control engine 306 of the controller 304 controls the operation of one or more components (e.g., the communication module 308, the timer 310, the transceiver 324) of the controller 304. Any of the functions performed by the control engine 306 can be based on one or more protocols 332 and/or one or more algorithms 333. For example, the control engine 306 can activate the communication module 308 when the communication module 308 is in "sleep" mode and when the communication module 308 is needed to send data received from another component (e.g., a user system 355, the gateway 380) in the system 300. As another example, the control engine 306 can operate the transceiver 324 to send a communication signal 378 (e.g., notifying that an initiation signal 376 has been received from a user system 355) to another component (e.g., the gateway 380) in the system 300.

As another example, the control engine 306 can interpret the initiation signal 376 received from a user device 355. In addition, the control engine 306 can generate and send a response signal 377 to the user device 376 in response to receiving an initiation signal 376 from the user device 355. Such a response signal 377 can include a form of identification (e.g., a UUID) of the electrical device 302-1. The control engine 306 can additionally send the response signal 377 to the gateway 380. Alternatively, the control engine 306 can generate a communication signal 378 to the gateway 380 informing the gateway 380 about the exchange between the user device 355 and the electrical device 302-1. As yet another example, the control engine 306 can acquire the current time using the timer 310. The timer 310 can enable the controller 304 to control the electrical device 302-1 even when the controller 304 has no communication with the gateway 380.

As another example, the control engine 306 can check one or more communication links 305 between the controller 304 and the gateway 380 and, if a communication link 305 is not functioning properly, allow the controller 304 to operate autonomously from the rest of the system 300. As yet another example, the control engine 306 can store configurations of the controller 304 (or portions thereof) in memory 322 (e.g., non-volatile memory) so that the controller 304 (or portions thereof) can operate regardless of whether the controller 304 is communicating with the network controller 380 and/or other components in the system 300. As still another example, the control engine 306 can receive a communication signal 378 from the gateway 380 and/or the user system 355 notifying the control engine 306 that the electrical device 302-1 is assigned to a particular group of electrical devices 302.

The control engine 306 can be configured to adjust the communication range 285 associated with the electrical device 302-1 and/or one or more other electrical devices 302-N. In addition, or in the alternative, the control engine 306 can be notified as to which group the electrical device 302-1 has been assigned, what commissioning parameters are assigned to the electrical device 302-1, the operational parameters assigned to the electrical device 302-1, changes to any commissioning and/or operating parameters assigned to the electrical device 302-1, and/or any other applicable information associated with the electrical device 302-1. This information can be received from the gateway 380 and/or a user system 355.

The control engine 306 can act on instructions (e.g., in a communication signal 378) for the associated electrical device 302-1 to be removed from a particular group after the control engine 306 sends a response signal 377 in response to an initiation signal 376 broadcast by a user system 355. For example, if a user 350 is attempting to assign all of the electrical devices 102 in the break room 195 to a single group, but inadvertently receives a response from electrical outlet 102-34 in the conference room 196, the control engine 306 can be configured to receive an instruction in a communication signal 378 (e.g., by a user 350 using software on the user system 355, by a user 350 using software on the gateway 380, by the gateway 380) to remove that electrical device 102-34 from the group.

In other words, the user 350 can manipulate a user device 355 and/or the gateway 380 to force the system 300 (e.g., through the gateway 380, through the controller 304 of the electrical device 302-1) to organize specific electrical devices 302 in a particular way. This type of assignment can be helpful in a number of applications, such as expediting the commissioning of the electrical devices 302 in the system 300 and downloading common settings to electrical devices 302 in the virtual group or zone. For instance, if a user 350 has an app related to the system 300 loaded onto the user system 355, when the app is open, a zone can be populated by the user 350, using the user system 355 in conjunction with the gateway 380 and/or one or more controllers 304.

The control engine 306 can provide control, communication, and/or other similar signals to a user system 355 of a user 350, the gateway 380, a sensor device 360, and the other electrical devices 302-N. Similarly, the control engine 306 can receive control, communication, and/or other similar signals from a user system 355 of a user 350, the gateway 380, a sensor device 360, and the other electrical devices 302-N. The control engine 306 can control one of its components (e.g. the transceiver 324) automatically (for example, based on one or more algorithms 333 stored in the storage repository 330) and/or based on control, communication, and/or other similar signals (e.g., an initiation signal 376, a communication signal 378) received from another device (e.g., a user system 350, the gateway 380) through a communication link 305. The control engine 306 may include a printed circuit board, upon which the hardware processor 320 and/or one or more discrete components of the controller 304 are positioned.

In certain example embodiments, the control engine 306 can include an interface that enables the control engine 306 to communicate with one or more components (e.g., power supply 340) of the electrical device 302-1. For example, if the power supply 340 of the electrical device 302-1 operates under IEC Standard 62386, then the power supply 340 can include a digital addressable lighting interface (DALI). In such a case, the control engine 306 can also include a DALI to enable communication with the power supply 340 within the electrical device 302-1. Such an interface can operate in conjunction with, or independently of, the protocols 332 used to communicate between the controller 304 and a user system 355 of a user 350, the gateway 380, a sensor device 360, and the other electrical devices 302-N.

The control engine 306 (or other components of the controller 304) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 308 of the controller 304 determines and implements the communication protocol (e.g., from the protocols 332 of the storage repository 330) that is used when the control engine 306 communicates with (e.g., sends signals to, receives signals from) a user system 355 of a user 350, the gateway 380, a sensor device 360, and the other electrical devices 302-N. In some cases, the communication module 308 accesses the stored data 334 to determine which protocol 322 is used to communicate with the gateway 380. In addition, the communication module 308 can interpret the protocol 332 of a communication received by the controller 304 so that the control engine 306 can interpret the communication.

The communication module 308 can send and receive data between the gateway 380, the other electrical devices 302-N, a sensor device 360, and/or a user system 355 of a user 350 and the controller 304. The communication module 308 can send and/or receive data in a given format that follows a particular protocol 332. The control engine 306 can interpret the data packet received from the communication module 308 using the protocol 332 information stored in the storage repository 330. The control engine 306 can also facilitate the data transfer between the gateway 380, the other electrical devices 302-N, a sensor device 360, and/or a user system 355 of a user 350 by converting the data into a format understood by the communication module 308.

The communication module 308 can send data (e.g., protocols 332, algorithms 332, stored data 334, operational information, error codes, threshold values of a parameter of a response signal 377, a range of acceptable values of a parameter of a response signal 377) directly to and/or retrieve data directly from the storage repository 330. Alternatively, the control engine 306 can facilitate the transfer of data between the communication module 308 and the storage repository 330. The communication module 308 can also provide encryption to data that is sent by the controller 304 and decryption to data that is received by the controller 304. The communication module 308 can also provide one or more of a number of other services with respect to data sent from and received by the controller 304. Such services can include, but are not limited to, data packet routing information and procedures to follow in the event of data interruption.

The timer 310 of the controller 304 can track clock time, intervals of time, an amount of time, and/or any other measure of time. The timer 310 can also count the number of occurrences of an event, whether with or without respect to time. Alternatively, the control engine 306 can perform the counting function. The timer 310 is able to track multiple time measurements concurrently. The timer 310 can track time periods based on an instruction received from the control engine 306, based on an instruction received from the user system 355 of a user 350, based on an instruction programmed in the software for the controller 304, based on some other condition or from some other component, or from any combination thereof.

The timer 310 can be configured to track time when there is no power delivered to the controller 304 (e.g., the power module 312 malfunctions) using, for example, a super capacitor or a battery backup. In such a case, when there is a resumption of power delivery to the controller 304, the timer 310 can communicate any aspect of time to the controller 304. In such a case, the timer 310 can include one or more of a number of components (e.g., a super capacitor, an integrated circuit) to perform these functions.

The power module 312 of the controller 304 provides power to one or more other components (e.g., timer 310, control engine 306) of the controller 304. In addition, in certain example embodiments, the power module 312 can provide power to the power supply 340 of the electrical device 302-1. The power module 312 can include one or more of a number of single or multiple discrete components (e.g., transistor, diode, resistor), and/or a microprocessor. The power module 312 may include a printed circuit board, upon which the microprocessor and/or one or more discrete components are positioned. In some cases, the power module 312 can include one or more components that allow the power module 312 to measure one or more elements of power (e.g., voltage, current) that is delivered to and/or sent from the power module 312.

The power module 312 can include one or more components (e.g., a transformer, a diode bridge, an inverter, a converter) that receives power (for example, through an electrical cable) from the power supply 340 and/or a source external to the electrical device 302-1. The power module 312 can use this power to generate power of a type (e.g., alternating current, direct current) and level (e.g., 12V, 24V, 120V) that can be used by the other components of the controller 304. In addition, or in the alternative, the power module 312 can be or include a source of power in itself to provide signals to the other components of the controller 304 and/or the power supply 340. For example, the power module 312 can be or include a battery or other form of energy storage device. As another example, the power module 312 can be or include a localized photovoltaic solar power system.

The hardware processor 320 of the controller 304 executes software, algorithms (e.g., algorithms 333), and firmware in accordance with one or more example embodiments. Specifically, the hardware processor 320 can execute software on the control engine 306 or any other portion of the controller 304, as well as software used by a user system 355 of a user 350, the gateway 380, a sensor device 360, and the other electrical devices 302-N. The hardware processor 320 can be an integrated circuit, a central processing unit, a multi-core processing chip, SoC, a multi-chip module including multiple multi-core processing chips, or other hardware processor in one or more example embodiments. The hardware processor 320 is known by other names, including but not limited to a computer processor, a microprocessor, and a multi-core processor.

In one or more example embodiments, the hardware processor 320 executes software instructions stored in memory 322. The memory 322 includes one or more cache memories, main memory, and/or any other suitable type of memory. The memory 322 can include volatile and/or non-volatile memory. The memory 322 is discretely located within the controller 304 relative to the hardware processor 320 according to some example embodiments. In certain configurations, the memory 322 can be integrated with the hardware processor 320.

In certain example embodiments, the controller 304 does not include a hardware processor 320. In such a case, the controller 304 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 304 (or portions thereof) to be programmable and function according to certain logic rules and thresholds without the use of a hardware processor. Alternatively, FPGAs, IGBTs, ICs, and/or similar devices can be used in conjunction with one or more hardware processors 320.

The transceiver 324 of the controller 304 can send and/or receive control and/or communication signals. Specifically, the transceiver 324 can be used to transfer data between the controller 304 and a user system 355 of a user 350, the gateway 380, a sensor device 360, and the other electrical devices 302-N. The transceiver 324 can use wired and/or wireless technology. The transceiver 324 can be configured in such a way that the control and/or communication signals sent and/or received by the transceiver 324 can be received and/or sent by another transceiver that is part of a user system 355 of a user 350, the gateway 380, a sensor device 360, and the other electrical devices 302-N. The transceiver 324 can use any of a number of signal types, including but not limited to radio frequency signals and visible light signals.

In certain example embodiments, the transceiver 324 of the controller 304 is configured to measure the signal strength (e.g., using Received Signal Strength Indication (RSSI)) of each communication (e.g., communication signal 378) received by the controller 304. Alternatively, some other component (e.g., the control engine 306) of the controller 304 can be used to measure the signal strength of each signal 395 received by the controller 304. In such a case, the signal strength of a communication can be measured in any of a number of ways, whether now known or developed in the future, using any equipment, whether now known or developed in the future. Alternatively, some other component of the electrical device 302-1 (e.g., a sensor device 360, circuitry included in an antenna 375) can be used to measure the signal strength of each communication received by the transceiver 324.

When the transceiver 324 uses wireless technology, any type of wireless technology can be used by the transceiver 324 in sending and receiving signals. Such wireless technology can include, but is not limited to, Wi-Fi, Zigbee, visible light communication, cellular networking, and Bluetooth. The transceiver 324 can use one or more of any number of suitable protocols 332 for communication (e.g., ISA100, HART) when sending and/or receiving signals. Such communication protocols can be stored in the protocols 332 of the storage repository 330. Further, any transceiver information for a user system 355 of a user 350, the gateway 380, a sensor device 360, and/or the other electrical devices 302-N can be part of the protocols 332 (or other areas) of the storage repository 330.

Optionally, in one or more example embodiments, the security module 328 secures interactions between the controller 304, a user system 355 of a user 350, the gateway 380, a sensor device 360, and/or the other electrical devices 302-N. More specifically, the security module 328 authenticates communication from software based on security keys verifying the identity of the source of the communication. For example, user software may be associated with a security key enabling the software of a user system 355 of a user 350 to interact with the controller 304. Further, the security module 328 can restrict receipt of information, requests for information, and/or access to information in some example embodiments.

As mentioned above, aside from the one or more optional sensor devices 360 and the controller 304 and its components, the electrical device 302-1 can include one or more antennae 375, one or more optional switches 345, a power supply 340, and one or more electrical device components 342. The controller 304 and the sensor devices 360 are discussed above. The electrical device components 342 of the electrical device 302-1 are devices and/or components typically found in an electrical device 302-1 to allow electrical device 302-1 to operate. The electrical device components 342 can be electrical, mechanical, electro-mechanical, or electronic. For example, if the electrical device 302-1 is a light fixture, then examples of electrical device components 342 can include, but are not limited to, a light source, a heat sink, a terminal block, a wire, a lens, a reflector, a bezel, an air moving device, a baffle, a circuit board, and an energy storage device.

The power supply 340 of the electrical device 302-1 receives power (e.g., primary power, secondary power) from an external source (e.g., a wall outlet, an energy storage device). The power supply 340 uses the power it receives (e.g., from AC mains) to generate and provide power to the power module 312 of the controller 304, the antennae 175, the switches 145, the sensor devices 360, and one or more of the electrical device components 342. The power supply 340 can be called by any of a number of other names, depending on the electrical device 302-1. For example, if the electrical device 302-1 is a light fixture, then the power supply 340 can be called, for example, a driver, a LED driver, or a ballast. The power supply 340 can include one or more of a number of single or multiple discrete components (e.g., transistor, diode, resistor), and/or a microprocessor. The power supply 340 may include a printed circuit board, upon which the microprocessor and/or one or more discrete components are positioned, and/or a dimmer.

In some cases, the power supply 340 can include one or more components (e.g., a transformer, a diode bridge, an inverter, a converter) that receives power (for example, through an electrical cable) from a source (e.g., AC mains, the power module 312 of the controller 304) and generates power of a type (e.g., alternating current, direct current) and level (e.g., 12V, 24V, 120V) that can be used by the antennae 175, the switches 345, the sensor devices 360, and/or the electrical device components 342. In addition, or in the alternative, the power supply 340 can be or include a source of power in itself. For example, the power supply 340 can or include be or include a battery, a localized photovoltaic solar power system, or some other source of independent power.

Each antenna 375 of the electrical device 302-1 is a component that converts electrical power to response signals 377 and communication signals 378 (for transmitting) and initiation signals 376 and communication signals 378 to electrical power (for receiving). In transmission, a radio transmitter (e.g., transceiver 324) supplies, through the optional switch 345 when the switch 345 exists, an electric current oscillating at radio frequency (i.e., a high frequency alternating current (AC)) to the terminals of the antenna 375, and the antenna radiates the energy from the current as response signals 377 or communication signals 378. In reception, an antenna 375 intercepts some of the power of initiation signals 376 or communication signals 378 in order to produce a tiny voltage at its terminals, that is applied through the switch 345 to a receiver (e.g., transceiver 324) to be amplified.

An antenna 375 can typically consist of an arrangement of electrical conductors that are electrically connected to each other (often through a transmission line) to create a body of the antenna 375. The body of the antenna 375 is electrically coupled to the transceiver 324. An oscillating current of electrons forced through the body of an antenna 375 by the transceiver 324 will create an oscillating magnetic field around the body, while the charge of the electrons also creates an oscillating electric field along the body of the antenna 375. These time-varying fields radiate away from the antenna 375 into space as a moving transverse response signal 377 or communication signal 378 (often an electromagnetic field wave). Conversely, during reception, the oscillating electric and magnetic fields of an incoming initiation signal 376 or communication signal 378 create oscillating currents in the antenna 375.

In certain example embodiments, an antenna 375 can be disposed at, within, or on any portion of the electrical device 302-1. For example, an antenna 375 can be disposed on the housing 303 of the electrical device 302-1 and extend away from the electrical device 302-1. As another example, an antenna 375 can be insert molded into a lens of the electrical device 302-1. As another example, an antenna 375 can be two-shot injection molded into the housing 303 of the electrical device 302-1. As yet another example, an antenna 375 can be adhesive mounted onto the housing 303 of the electrical device 302-1. As still another example, an antenna 375 can be pad printed onto a circuit board within the cavity 301 formed by the housing 303 of the electrical device 302-1. As yet another example, an antenna 375 can be a chip ceramic antenna that is surface mounted. As still another example, an antenna 375 can be a wire antenna.

An antenna 375 can be electrically coupled to the optional switch 345, which in turn is electrically coupled to the transceiver 324. Without the switch 345, an antenna 375 can be directly electrically coupled to the transceiver 324. The optional switch 345 can be a single switch device or a number of switch devices arranged in series and/or in parallel with each other. The switch 345 determines which antenna 375 (in the case of multiple antennae 375) or when the lone antenna 375 is coupled to the transceiver 324 at any particular point in time.

A switch 345 can have one or more contacts, where each contact has an open state and a closed state (position). In the open state, a contact of the switch 345 creates an open circuit, which prevents the transceiver 324 from delivering a response signal 377 or a communication signal 378 to or receiving an initiation signal 376 or a communication signal 378 from the antenna 375 electrically coupled to that contact of the switch 345. In the closed state, a contact of the switch 345 creates a closed circuit, which allows the transceiver 324 to deliver a response signal 377 or a communication signal 378 to or receive an initiation signal 376 or a communication signal 378 from the antenna 375 electrically coupled to that contact of the switch 345.

In certain example embodiments, the position of each contact of the optional switch 345 is controlled by the control engine 306 of the controller 304. If the switch 345 is a single device, the switch 345 can have multiple contacts. In any case, only one contact of the switch 345 can be active (closed) at any point in time in certain example embodiments. Consequently, when one contact of the switch 345 is closed, all other contacts of the switch 345 are open in such example embodiments.

As stated above, the electrical device 302-1 can be placed in any of a number of environments. In such a case, the housing 303 of the electrical device 302-1 can be configured to comply with applicable standards for any of a number of environments. For example, the electrical device 302-1 can be rated as a Division 1 or a Division 2 enclosure under NEC standards. Similarly, any of the devices (e.g., antenna 375) communicably coupled to the electrical device 302-1 can be configured to comply with applicable standards for any of a number of environments.

Figure 4:
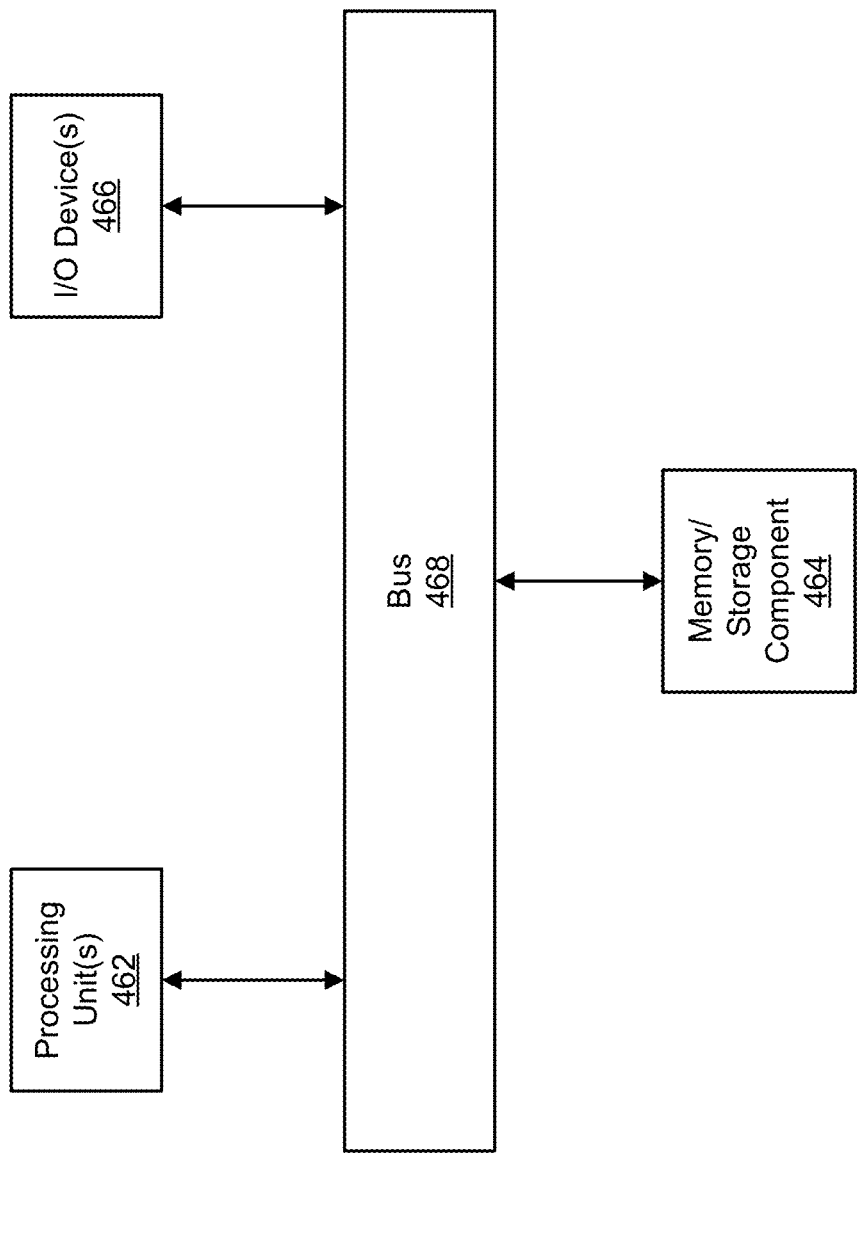
FIG. 4 shows a computing device in accordance with certain example embodiments.

FIG. 4 illustrates one embodiment of a computing device 461 that implements one or more of the various techniques described herein, and which is representative, in whole or in part, of the elements described herein pursuant to certain exemplary embodiments. For example, the control engine 306, the storage repository 330, the memory 322, the communication module 308, and the transceiver 324 of the electrical device 302-1 of FIG. 3 can be considered part of a computing device 461. Computing device 461 is one example of a computing device and is not intended to suggest any limitation as to scope of use or functionality of the computing device and/or its possible architectures. Neither should computing device 461 be interpreted as having any dependency or requirement relating to any one or combination of components illustrated in the example computing device 461.

Computing device 461 includes one or more processors or processing units 462, one or more memory/storage components 464, one or more input/output (I/O) devices 466, and a bus 468 that allows the various components and devices to communicate with one another. Bus 468 represents one or more of any of several types of bus structures, including a memory bus or memory controller, a peripheral bus, an accelerated graphics port, and a processor or local bus using any of a variety of bus architectures. Bus 468 includes wired and/or wireless buses.

Memory/storage component 464 represents one or more computer storage media. Memory/storage component 464 includes volatile media (such as random access memory (RAM)) and/or nonvolatile media (such as read only memory (ROM), flash memory, optical disks, magnetic disks, and so forth). Memory/storage component 464 includes fixed media (e.g., RAM, ROM, a fixed hard drive, etc.) as well as removable media (e.g., a Flash memory drive, a removable hard drive, an optical disk, and so forth).

One or more I/O devices 466 allow a customer, utility, or other user to enter commands and information to computing device 461, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 461 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 461 includes at least the minimal processing, input, and/or output means necessary to practice one or more embodiments.

Further, those skilled in the art will appreciate that one or more elements of the aforementioned computer device 461 is located at a remote location and connected to the other elements over a network in certain exemplary embodiments. Further, one or more embodiments is implemented on a distributed system having one or more nodes, where each portion of the implementation (e.g., control engine 306) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 5:
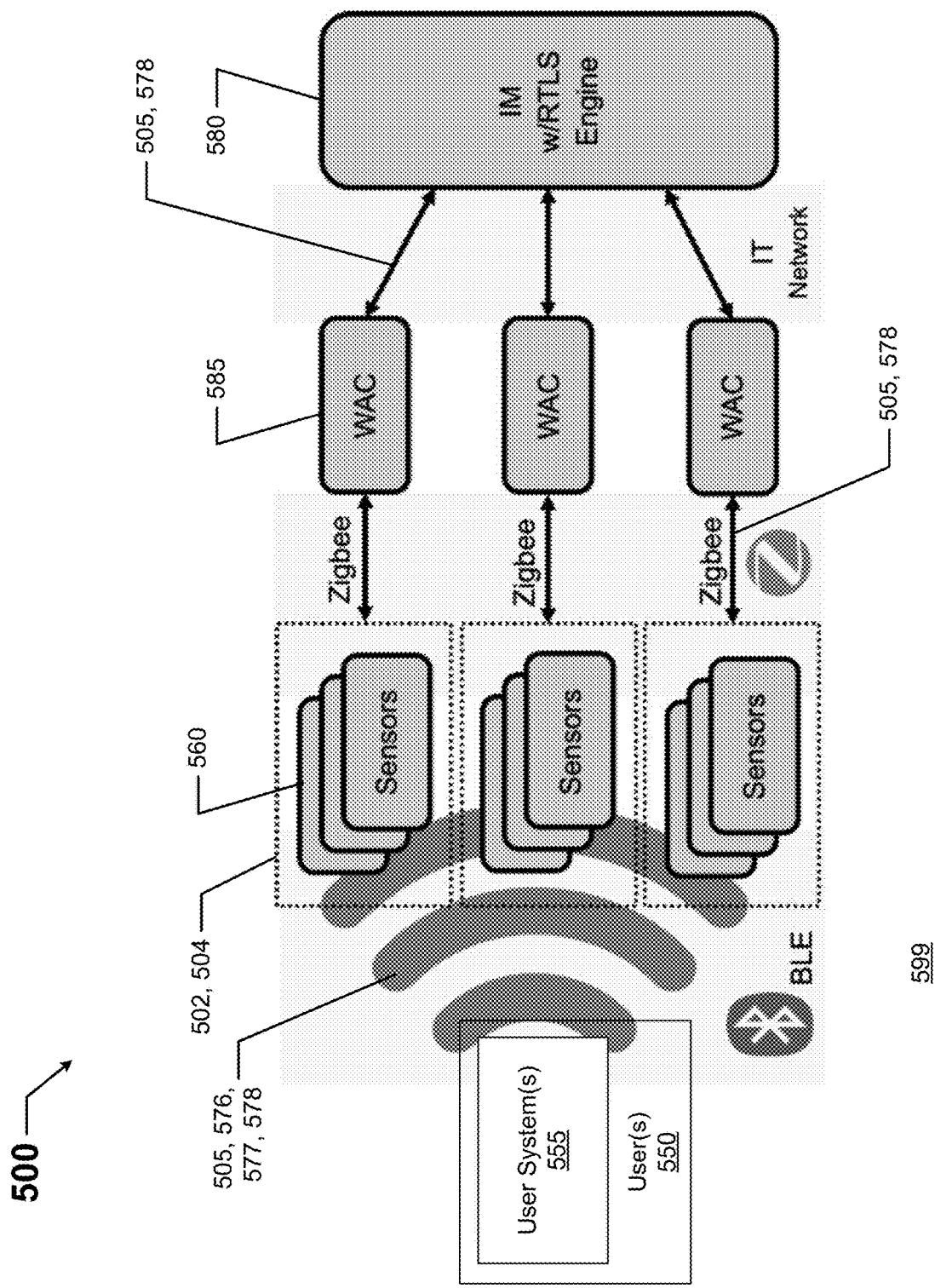
FIG. 5 shows a diagram of another system in accordance with certain example embodiments.

FIG. 5 shows a diagram of a system 500 in accordance with certain example embodiments. Specifically, the system 500 uses RTLS protocols to locate electrical devices 502 for the purpose of assigning certain electrical devices 502 to particular groups in accordance with certain example embodiments. Referring to FIGS. 1 through 5, the system 500 of FIG. 5 includes a user 550 with a user system 555, a number of electrical devices 502 each having one or more sensor devices 560, a number of wireless access controllers 585 (WACs 585), and a gateway 580 (also sometimes called an insight manager (IM) with a RTLS engine, a master controller, or a network manager). At least the user system 555 and the electrical devices 502 are located in a volume of space 599.

The system of FIG. 5 is arranged in a hierarchy, with the gateway 580 at the top of the structure, followed by the WACs 585, and then the electrical devices 502. The user devices 555 can communicate directly with any of these other components of the system 500. Aside from the WACs 585, which are not shown in the system 300 of FIG. 3, each of these components of the system 500 of FIG. 5 can be substantially the same as the corresponding component of the system 300 of FIG. 3.

Each WAC 585 (sometimes more simply called an access controller, as a generic term and/or when wired communication links 505 are involved) performs a number of different functions. For example, a WAC 585 can help communicate with and control the controller 504 of one or more electrical devices 502 to help control the operation of those electrical devices 502. For RTLS applications, the WAC 585 can be responsible for pairing with the Zigbee-enabled electrical devices 502 and/or user systems 555, providing configuration data to the electrical devices 502 and/or user systems 555, synchronizing the timing of those electrical devices 502 and/or user systems 555, supporting the firmware of those electrical devices 502 and/or user systems 555, upgrading those electrical devices 502 and/or user systems 555, receiving location/telemetry data (e.g., using a Zigbee-enabled communication links 505) from the electrical devices 502 and/or user systems 555, and/or performing any other function with respect to those electrical devices 502 and/or user systems 555 to support RTLS activities.

When a WAC 585 receives data (e.g., packed egress data that arrives as ingress data) from an electrical device 502 and/or a user system 555, the WAC 585 can convert the data into a different format (e.g., ECAPI). The WAC 585 can then send the newly-formatted data to the gateway 580. To help diagnose issues, a WAC 585 can maintain counters for each paired electrical device 502 and/or user system 555 and include, for example, the number of received packed data messages from a particular electrical device 502 and/or user system 555, the number of formatted messages successfully transmitted to the gateway 580 that pertain to the packed data from a particular electrical device 502 and/or user system 555, and the number of formatted messages pertaining to the packed data from a particular electrical device 502 and/or user system 555 that failed to transmit to the gateway 580.

In some cases, a WAC 585 maintains the average and maximum latency introduced between the receipt of a message from a electrical device 502 and/or user system 555 and transmission of a formatted message to the gateway 580. The WAC 585 can also notify the gateway 580 when the average or maximum latency exceeds a threshold value. Further, a WAC 585 can communicate to the gateway 580 when there is a significant discrepancy (e.g., as determined by the WAC 585) between the ingress and egress packets with respect to an electrical device 502 and/or user system 555. When there are multiple WACs 585, they can all be time-synchronized with each other. In some cases, the functionality of a WAC 585 can be the same as, or at least partially combined with, the functionality of the controller 504 of an electrical device 502. A WAC 585 can be located in the volume of space 599 or remotely from the volume of space 599.

In this particular case, the user devices 555 are the physical entities that are used to measure the signal strength of the response signals 577 that are sent in response to the initiation signals 576 broadcast by the user system 555. From the perspective of the system 500, each user device 555 can be associated with a user 550. In this example, the user devices 555 use BLE (a form of communication link 505) to "beacon" or broadcast the initiation signals 576 and subsequently the communication signals 578 at a certain rate. A communication signal 578 is a broadcast message that, at a minimum, identifies the user device 555 (if not also the user 550) sending the communication signal 578. By contrast, the initiation signals 576 broadcast by the user system 555 may not identify the user system 555 or associated user 550. One or more of the sensor devices 560 (as when the sensor device 560 is integrated, as discussed above) and/or one or more controllers of the electrical devices 502 receive these various signals (e.g., initiation signals 576, communication signals 578) over the communication links 505 (some of which can be BLE-enabled). The user system 555 can receive the response signals 577 from the electrical devices 502 using communication links 505 and measure the RSSI value of the response signals 577. The user system 555 can also interpret other data included in the response signals 577.

This RSSI information (and/or other parameters of the response signal 577 measured by the user system 555) is the key piece of data in a response signal 577 that allows the user system 555 to determine whether a particular electrical device 502 sending a response signal 577 should be included into a particular group. For example, if a response signal 577 has a value that exceeds a threshold value (e.g., −15 dB) or is within a range of acceptable values, then the electrical device 502 that sent the response signal 577 is included in the group being established.

If multiple parameters of a response signal 577 are being evaluated, those parameters can be evaluated in a hierarchy. For example, the first criteria for evaluating a response signal 577 can be that the RSSI value of the response signal 577 exceed a threshold value (e.g., −20 dB) or is within a range of acceptable values. If so, then the user system 555 determines whether the AoA of the response signal 577 is within plus-or-minus 60°. A group can be established by the user system 555. Alternatively, the user system 555 can send the RSSI value (and/or other measured parameter) associated with each response signal 577 of sent by an electrical device 502 to a WAC 585 and/or gateway 580 to determine which of those electrical devices 502 should be assigned to a particular group.

The RSSI value and/or other parameter of a response signal 577 measured by the user system 555 can be used to locate, in real time, the electrical devices 502 within a volume of space 599 (e.g., in X-Y coordinates, in X-Y-Z coordinates). As used herein, "real time" refers to a user's perspective of the system and means that electrical devices 502 can be located and assigned to a group within the time in which the signals are transmitted and processed, such as a few milliseconds to within a few seconds, which time is virtually real time from the perspective of a user 550. A user system 555 can communicate with one or more WACs 585 and/or the gateway 580 using Zigbee-enabled communication links 505. In this case, the user system 555 is a Zigbee-enabled device as well as a BLE-enabled device, and so the user system 555 can be paired with a single WAC 585. Similarly, a controller 504 of an electrical device 502 can be a Zigbee-enabled device as well as a BLE-enabled device, and so a controller 504 can be paired with a single WAC 585.

In some cases, a user system 555 is not configured to determine the location of each of the electrical devices 502 based on the response signals 577 received by the user system 555. In such a case, a WAC 585 and/or the gateway 580 can make such a determination using communication signals 578 generated and sent by the user system 555, where the communication signals 578 can include such information as the one or more parameters of the response signal 577 measured by the user system 555, the value of those parameters, the identification of the electrical device 502 sending the response signal 577, and the identification of the user system 555.

In addition to establishing groupings of electrical devices 502 using example embodiments, the components of the system 500 are configured to communicate with each other using communication signals 578 sent over the communication links 505. For example, the WACs 585, upon receiving communication signals 578 from the user systems 555 and/or the controllers 504 of the electrical devices 502 on the Zigbee-enabled communication links 505, send the information in these communication signals 578 (often in the form of new communication signals 578) to the gateway 580, which process all of this information (e.g., using one or more protocols 332 and/or algorithms 333) in real time. The gateway 580 can store this information and use it for trending analysis, predictive analysis, and/or any other analysis that may be useful.

BLE proximity methods are widely used in the industry to estimate the distance between a BLE transmitter (e.g., an electrical device 502) and a BLE receiver (e.g., a user device 555). In a dense and uniformly distributed infrastructure of electrical devices 502 (e.g., a lighting system), these methods can be optimized to achieve greater accuracy by comparing the RSSI at many BLE receivers and performing various calculations (by a user system 555, by a WAC 585, by the gateway 580) to estimate the location of an electrical device 502 in the volume of space 599 and determine whether the electrical device 502 should be assigned to a particular group.

Figure 6:
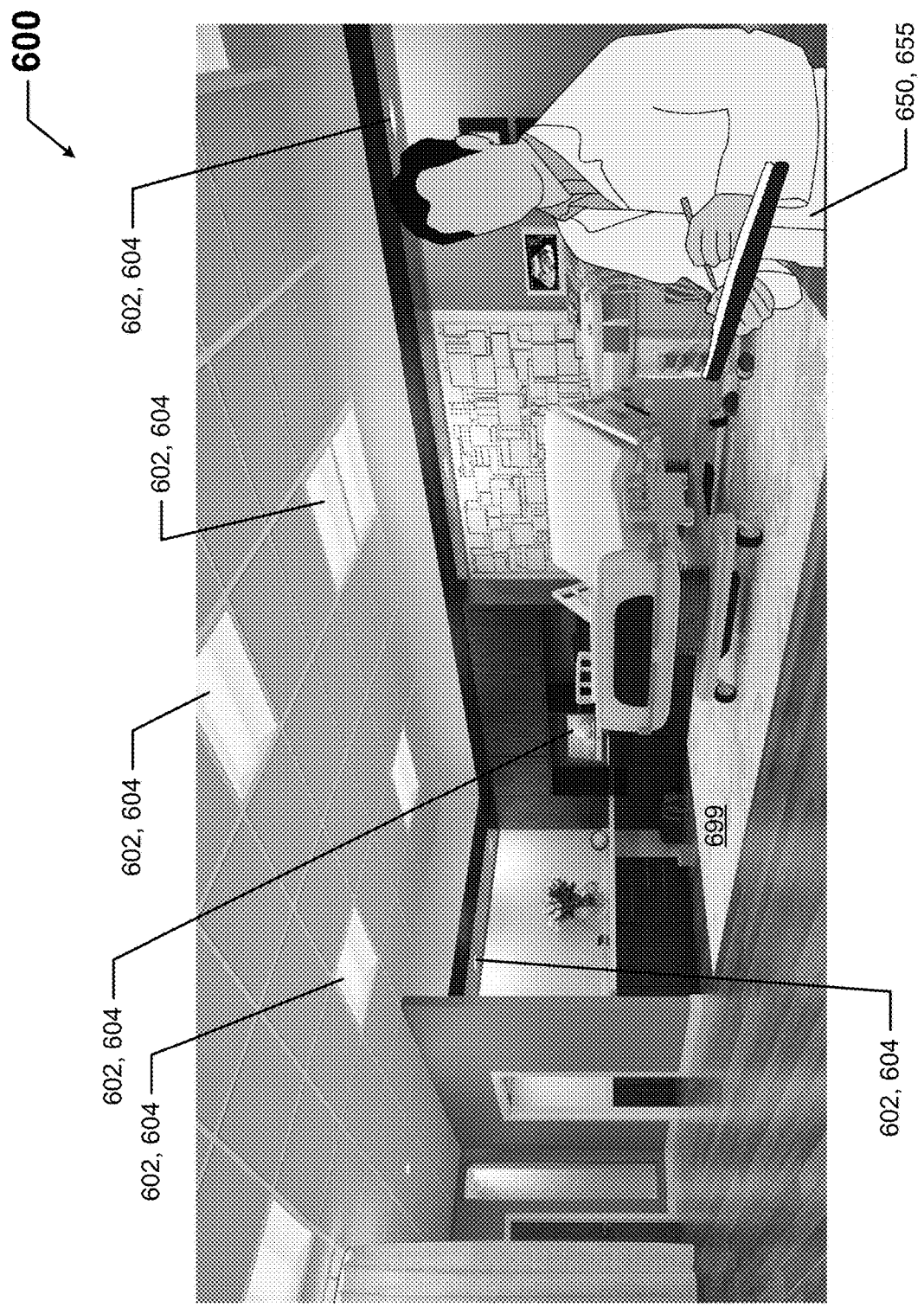
FIG. 6 shows a lighting system in a healthcare environment in accordance with certain example embodiments.

FIG. 6 shows a system 600 that can be used for providing real-time location and group assignment services of electrical devices 502 in a volume of space 699 in accordance with certain example embodiments. Referring to FIGS. 1 through 6, the lighting system 600 includes a number of electrical devices 602, principally in the form of light fixtures, located in a volume of space 699 that includes a hospital room within a clinic or hospital. A lighting system provides unique advantages for implementing an example RTLS because the density of the electrical devices (light fixtures) supports a dense network for assigning electrical devices 602 to groups. Of the electrical devices 602 that are light fixtures, there are seven troffer light fixtures and five down can light fixtures disposed in the ceiling of the room. There is also an electrical device 602 in the form of a computer monitor. In this case, each electrical device 602 includes a controller 604, substantially similar to the controller 304 discussed above. There is also a user 650 (a resident doctor) holding a user device 655 in the form of an electronic tablet (loaded with an app for assigning electrical devices 602 to groups)

in the volume of space 699. The user device 655 is capable of communicating with the controllers 604 of the electrical devices 602.

Figure 7:
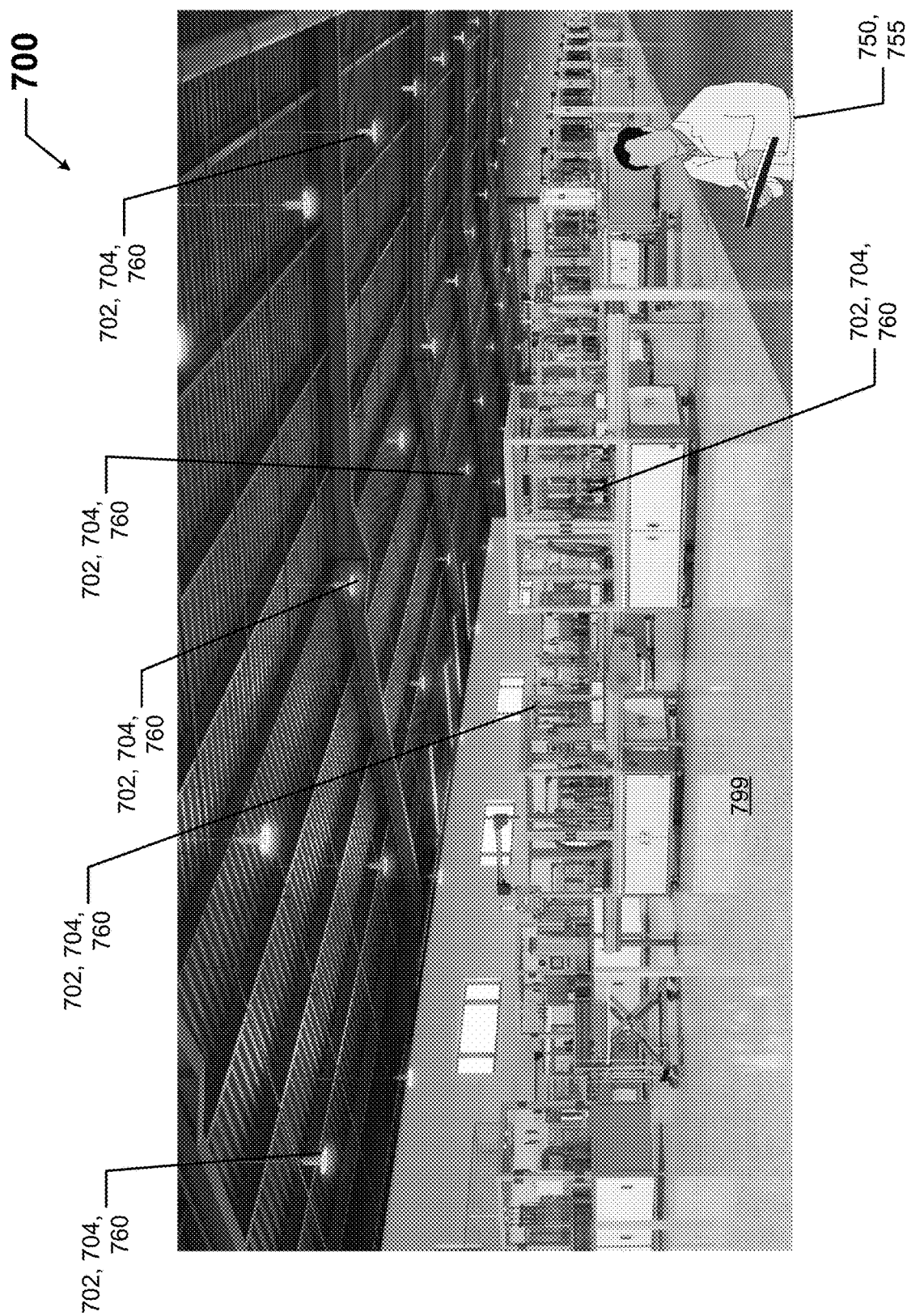
FIG. 7 shows a lighting system in a manufacturing environment in accordance with certain example embodiments.

FIG. 7 shows a system 700 that can be used for providing real-time location and group assignment services of electrical devices 702 in a volume of space 799 in accordance with certain example embodiments. Referring to FIGS. 1 through 7, the lighting system 700 includes a number of electrical devices 702, principally in the form of light fixtures, located in a volume of space 799 that includes a manufacturing facility. Of the electrical devices 702 that are light fixtures, there are at least 56 Hi-Bay light fixtures suspended from the ceiling and at least 30 work stations located on the floor. In this case, each electrical device 702 includes a controller 704 and a sensor device 760, substantially similar to the controllers 304 and the sensor devices 360 discussed above. There is also a user 750 (a supervisor) with a user device 755 in the form of an electronic tablet shown in FIG. 7. The user device 755 in this case is configured to communicate with the controllers 704 of the electrical devices 702 by broadcasting initiation signals and receiving response signals so that one or more of the electrical devices 702 can be assigned to one or more groups.

FIG. 8 shows a system 800 for transceiving communication signals in a volume of space 899 in accordance with certain example embodiments. Referring to FIGS. 1 through 8, located in the volume of space 899 of FIG. 8 is an electrical device 802 having a controller 804 (including a transceiver 824) and an antenna 875-1. Also located in the volume of space 899 is a user device 855 of a user 850, where the user device 855 has an antenna 875-2. These components of FIG. 8 are substantially the same as the corresponding components of FIG. 3 discussed above. The volume of space 899 can be of any size and/or in any location. For example, the volume of space 899 can be a room in an office building.

As shown in FIG. 8, the antenna 875-1 of the electrical device 802 can be located in the volume of space 899. Alternatively, the antenna 875-1 can be located on another electrical device (e.g., another light fixture, on a thermostat, on a clock/radio, on a security camera). In any case, it is possible that the antenna 875-1 can be located outside the volume of space 899, as long as the initiation signals (e.g., initiation signals 376) sent by the antenna 875-2 of the user device 855 of the user 850 are received by the antenna 875-1 of the electrical device 802. For example, when an initiation signal is a RF signal, the initiation signal can travel through walls, windows, floors, and ceilings.

The antenna 875-1, when combined with the transceiver 824 of the controller 804, has a communication range 888-1. The communication range 888-1 defines a maximum volume within the volume of space 899 in which the transceiver 824 can send and receive signals (e.g., initiation signals 376, response signals 377, communication signals 378). The user device 855 of the user 850 can have a communication range 888-2, which defines a maximum volume within the volume of space 899 in which the user device 855 can send and/or receive signals. The user device 855 can also include a controller, such as the controller 304 described above with respect to FIG. 3.

If the communication range 888-1 of the controller 804 of the electrical device 802 intersects with the communication range 888-2 of the user device 855, then the controller 804 and the user device 855 can transmit signals between each other. Conversely, if the communication range 888-1 of the controller 804 of the electrical device 802 fails to intersect the communication range 888-2 of the user device 855, then the controller 804 and the user device 855 fail to communicate with each other.

FIGS. 9A and 9B show a side and top view, respectively, of a system 900 in which a user device 955 is located in volume of space 999 in accordance with certain example embodiments. Referring to FIGS. 1 through 9B, also located in the volume of space 999 of FIGS. 9A and 9B are three electrical devices 902 in the form of light fixtures (specifically, electrical device 902-1, electrical device 902-2, and electrical device 902-3), where the electrical devices 902 are substantially similar to the electrical devices 302 of FIG. 3 above. Similarly, the user device 955 is substantially similar to the user device 355 of FIG. 3 above and the user device 1255 of FIG. 12 below. As discussed above, the volume of space 999 can be of any size and/or in any location. For example, the volume of space 999 can be one or more rooms in a large office building.

As shown in FIGS. 9A and 9B, all of the electrical devices 902 can be located in the volume of space 999. Alternatively, one or more of the electrical devices 902 can be located outside the volume of space 999, as long as the signals (e.g., response signals 377, communication signals 378) sent by the transceiver (e.g., transceiver 324) of the electrical device 902 are received by the user device 955, and as long as the signals (e.g., initiation signals 376, communication signals 378) sent by the user device 955 are received by the transceiver of the corresponding electrical device 902, as applicable.

Each of the electrical devices 902 can include a controller and an associated transceiver, substantially similar to the controller 304 and associated transceiver 324 discussed above. In this example, the transceiver of electrical device 902-1, electrical device 902-2, and electrical device 902-3 can include a Zigbee-enabled receiver and a BLE-enabled transceiver. In such a case, the BLE-enabled receiver of each electrical device 902 is capable of transmitting signals (e.g., response signals 377) in the form of RF signals with the user device 955.

Figure 10:
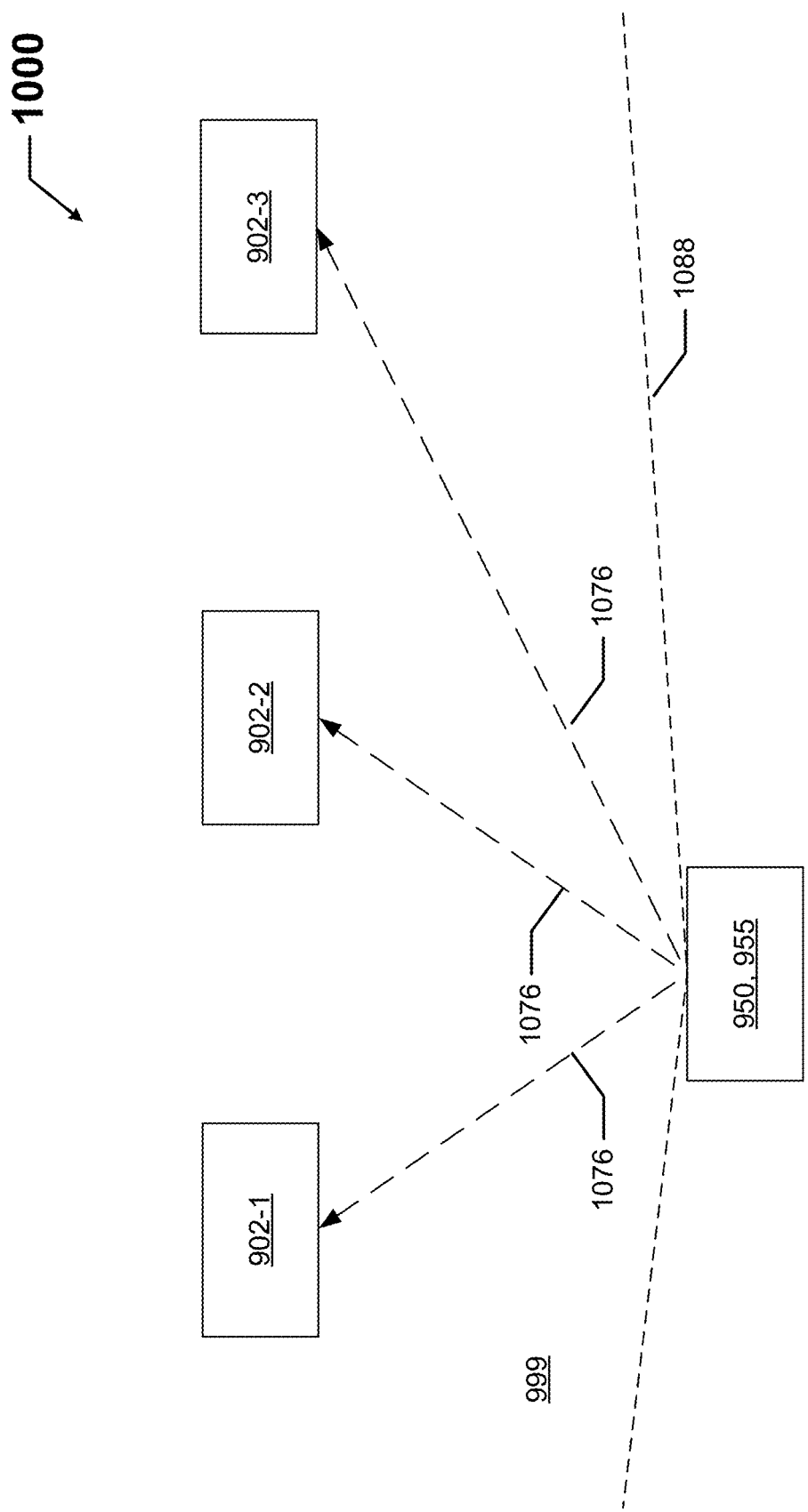
FIG. 10 shows the system of FIGS. 9A and 9B when a signal is sent by the user device in accordance with certain example embodiments.

FIG. 10 shows a system 1000 that is identical to the system 900 of FIGS. 9A and 9B, except that the user device 955 is broadcasting an initiation signal 1076. Referring to FIGS. 1 through 10, the initiation signal 1076 sent by the user device 955 can be initiated by the user 950 interacting with the user device 955. Alternatively, the user device 955 can send the initiation signal 1076 based on instructions from the gateway (e.g., gateway 380). As discussed above, the initiation signal 1076 broadcast by the user device 955 can include the UUID of the user device 955, as well as other code (e.g., addresses of only certain types (e.g., light fixtures) of electrical devices 902, address or identification of the user device 955) that might be useful in establishing groups of electrical devices 902 within the volume of space 999.

The user device 955 has a broadcast range 1088, and all three of the electrical devices 902 are located within the broadcast range 1088 of the user device 955. As a result, as shown in FIG. 10, all three of the electrical devices 902 receive the initiation signal 1076 broadcast by the user device 955. When each electrical device 902 receives the initiation signal 1076 broadcast by the user device 955, the controller of that electrical device 902 can process the initiation signal 1076 to determine its contents.

Figure 11:
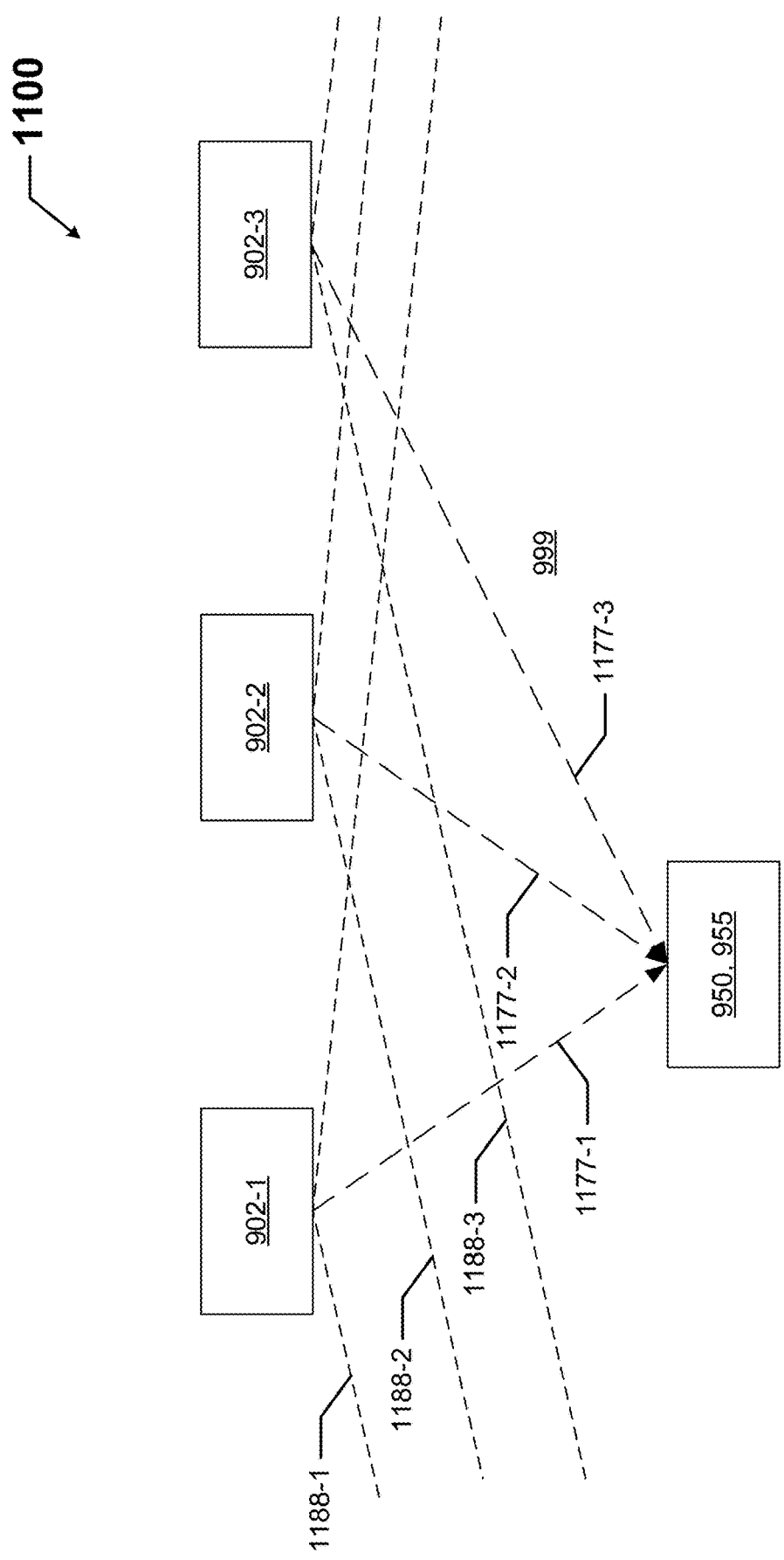
FIG. 11 shows the system of FIGS. 9A through 10 when a signal is sent by electrical devices in accordance with certain example embodiments.

FIG. 11 shows a system 1100 that is identical to the system 900 of FIGS. 9A and 9B, except that the electrical devices 902 are sending response signals 1177. Referring to FIGS. 1 through 11, the transceiver of each electrical device 902 has a broadcast range 1188. In this case, the transceiver of electrical device 902-1 has broadcast range 1188-1, the transceiver of electrical device 902-2 has broadcast range 1188-2, and the transceiver of electrical device 902-3 has broadcast range 1188-3. In this case, the user system 955 is within all three broadcast ranges 1188.

Specifically, since the user device 955 is located within the broadcast range 1188-1 for the transceiver of electrical device 902-1, the user device 955 receives response signal 1177-1 sent by electrical device 902-1. Also, since the user device 955 is located within the broadcast range 1188-2 for the transceiver of electrical device 902-2, the user device 955 receives response signal 1177-2 sent by electrical device 902-2. Finally, since the user device 955 is located within the broadcast range 1188-3 for the transceiver of electrical device 902-3, the user device 955 receives response signal 1177-3 sent by electrical device 902-3.

Each of the response signals 1177 can be sent, as an example, using BLE. In alternative embodiments, the transceiver of each electrical device 902 can be enabled for some other communication protocol aside from BLE. Examples of such other communication protocols can include, but are not limited to, Bluetooth, Zigbee, and Wi-Fi. In any case, the user device 955 can receive the response signals 1177 sent by the transceiver of electrical devices 902.

Figure 12:
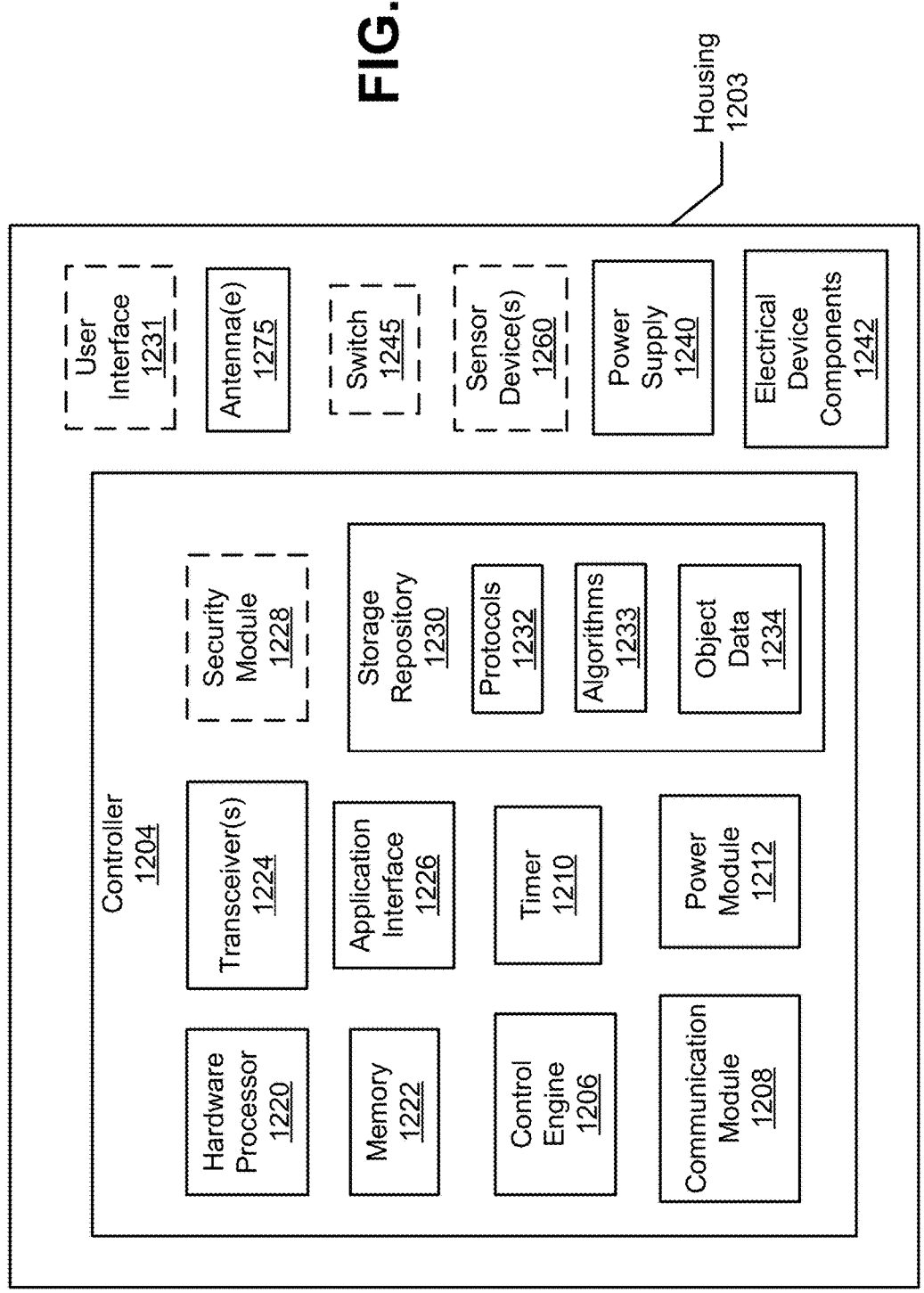
FIG. 12 shows a diagram of an integrated sensor module in accordance with certain example embodiments.

FIG. 12 shows a diagram of a user system 1255 in accordance with certain example embodiments. Referring to FIGS. 1 through 12, the user system 1255 of FIG. 12 can include one or more of a number of components. Such components, can include, but are not limited to, a controller 1204 (which can include, for example, a control engine 1206, a communication module 1208, a timer 1210, a power module 1212, a storage repository 1230, a hardware processor 1220, a memory 1222, one or more transceivers 1224, an application interface 1226, and, optionally, a security module 1228), one or more optional user interfaces 1231, one or more antennae 1275, one or more optional switches 1245, one or more optional sensor devices 1260, a power supply 1240, and one or more electrical device components 1242.

The user system 1255 of FIG. 12 is a more detailed example of a user system described above with respect to FIG. 3. The components shown in FIG. 12 are not exhaustive, and in some embodiments, one or more of the components shown in FIG. 12 may not be included in an example user system 1255. Any component of the example user system 1255 can be discrete, combined with one or more other components of the user system 1255, and/or shared with another component (e.g., the gateway 380) of a larger interconnected system (e.g., system 300 of FIG. 3).

The controller 1204, the control engine 1206, the communication module 1208, the timer 1210, the power module 1212, the storage repository 1230 (which can include protocols 1231, algorithms 1232, and object data 1234), the hardware processor 1220, the memory 1222, the one or more transceivers 1224, the application interface 1226, the security module 1228, the antennae 1275, the switches 1245, the sensor devices 1260, the power supply 1240, the electrical device components 1242, and the housing 1203 can be substantially the same as the corresponding components of the electrical device 302-1 discussed above with respect to FIG. 3.

Also, the storage repository 1230 of the user system 1255 can include one or more algorithms 1233 and/or protocols 1232 to measure one or more parameters of a return signal (e.g., return signal 377) sent by an electrical device (e.g., electrical device 302). More specifically, the control engine 1206 of the user system 1255 can measure one or more parameters of the response signals sent by one or more electrical devices in a volume of space based on one or more initiation signals (e.g., initiation signal 376) sent by the user system 1255. To accomplish this, the control engine 1206 obtains the response signals (directly from the antennae 1275 or through a switch 1245) broadcast by one or more electrical devices. The control engine 1206 can also uses one or more protocols 1232 and/or algorithms 1233 to determine one or more parameters of the response signals.

For example, the protocols 1232 and/or algorithms 1233 used by the control engine 1206 can require the control engine 1206 to determine the AoA and/or the angle of departure (AoD) of each response signal received from an electrical device. The protocols 1232 and/or algorithms 1233 can also be used by the control engine 1206 to dictate when and how the control engine 1206 operates the optional switch 1245. As another example, the protocols 1232 and/or algorithms 133 can require the control engine 1206 to measure the signal strength (e.g., RSSI value) of a response signal sent by an electrical device. In certain example embodiments, the protocols 1232 and/or algorithms 1233 can be used by the control engine 1206 to determine a two-dimensional or a three-dimensional location of an electrical device within the volume of space.

The optional user interface 1231 of the user system 1255 can take on various forms and serve one or more of a number of functions. Examples of a user interface 1231 can include, but are not limited to, an interactive touch screen, one or more pushbuttons, one or more dials, one or more switches, a keyboard, a mouse, and one or more slidebars. Some non-exclusive example functions that can be served by a user interface 1231 can include displaying results of analyzing response signals (e.g., response signals 377), allowing a user (e.g., user 350) to adjust a threshold value or a range of acceptable values, allowing a user to adjust a characteristic (e.g., frequency, strength) of an initiation signal (e.g., initiation signal 376) broadcast by the user system 1255, allowing a user to broadcast an initiation signal 376, and allowing a user to determine which parameters of a response signal are evaluated.

Example embodiments can intelligently and automatically organize certain electrical devices in a system by selecting those devices in some unique and non-traditional way. For example, by broadcasting one or more initiation signals from a user system, all electrical devices that receive such initiation signals can respond by sending response signals. When the user system receives the response signals, one or more parameters of the response signals are evaluated. Based on this evaluation, one or more of the electrical devices sending the response signals can be assigned to a certain group or zone that is being populated. Example embodiments can be an effective way of efficiently commissioning a system of electrical devices. Example embodiments can also be used to easily create groups of electrical devices for efficient operation of those electrical devices. Example embodiments can save on maintenance and energy costs while also improving safety. Example embodiments use one or more protocols to assign electrical devices to groups and/or to address an entire group of electrical devices.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:
a first electrical device disposed within a volume of space;
a user system disposed in the volume of space, wherein the user system:
broadcasts a first initiation signal in the volume of space;
receives, in response to the first initiation signal, a first response signal from a first transceiver of the first electrical device, wherein the first response signal comprises a first identification of the first electrical device;
measures at least one parameter associated with the first response signal;
determines a device type of the first electrical device based on the first identification;
determines whether the at least one parameter of the first response signal is within a range of acceptable values; and
assigns the first electrical device to a first group based at least on the device type of the first electrical device and when the at least one parameter of the first response signal is determined to be within a range of acceptable values; and
a second electrical device disposed within the volume of space, wherein the second electrical device receives the first initiation signal,
wherein the user system further:
receives, in response to the first initiation signal, a second response signal from a second transceiver of the second electrical device, wherein the second response signal comprises a second identification of the second electrical device;
measures at least one parameter associated with the second response signal;
determines a device type of the second electrical device based on the second identification;
determines whether the at least one parameter of the second response signal is within a range of acceptable values; and
assigns the second electrical device to the first group based at least on the device type of the second electrical device and when the at least one parameter of the second response signal is determined to be within the range of acceptable values.

2. The system of claim 1, further comprising:
a third electrical device disposed within the volume of space, wherein the third electrical device fails to receive the first initiation signal, and wherein the third electrical device fails to generate a third response signal.

3. The system of claim 1, wherein the first initiation signal is broadcast when a user interacts with a user interface on the user system.

4. The system of claim 3, wherein the user interface allows for control of a broadcast range of the first initiation signal.

5. The system of claim 3, wherein the user interface allows for control of the range of acceptable values of the at least one parameter of the first response signal.

6. The system of claim 1, wherein the user system and the first electrical device are within a communication range of each other.

7. The system of claim 1, wherein the first electrical device is added to the first group during commissioning of the first electrical device.

8. The system of claim 1, wherein the first electrical device is among a plurality of electrical devices assigned to the first group, wherein the plurality of electrical devices assigned to the first group receive a common set of operating parameters.

9. The system of claim 1, further comprising:
a gateway communicably coupled to the user system, wherein the gateway establishes the range of acceptable values.

10. The system of claim 9, wherein the gateway manages the first group over time.

11. The system of claim 1, wherein the device type of the first electrical device is based on rating information for the first electrical device.

12. The system of claim 1, wherein the device type of the first electrical device is based on a firmware version of the first electrical device.

13. The system of claim 1, wherein the first response signal further comprises a measurement of an additional parameter measured by a sensor of the first electrical device, and wherein the first electrical device is assigned to the first group further based on determining that the measurement of the additional parameter falls within an additional range of acceptable values.

14. A system comprising:
a first electrical device disposed within a volume of space;
a user system disposed in the volume of space, wherein the user system:
broadcasts a first initiation signal in the volume of space;
receives, in response to the first initiation signal, a first response signal from a first transceiver of the first electrical device, wherein the first response signal comprises a first identification of the first electrical device;
measures at least one parameter associated with the first response signal;
determines a device type of the first electrical device based on the first identification;
determines whether the at least one parameter of the first response signal is within a range of acceptable values; and
assigns the first electrical device to a first group based at least on the device type of the first electrical device and when the at least one parameter of the first response signal is determined to be within a range of acceptable values; and
a second electrical device disposed within the volume of space, wherein the second electrical device receives the first initiation signal,
wherein the user system further:
receives, in response to the first initiation signal, a second response signal from a second transceiver of the second electrical device, wherein the second response signal comprises a second identification of the second electrical device;
measures at least one parameter associated with the second response signal;

determines a device type of the second electrical device based on the second identification;

determines whether the at least one parameter of the second response signal is within a range of acceptable values; and maintains the first group without adding the second electrical device based on the device type of the second electrical device.

15. A system comprising:

a first electrical device disposed within a volume of space;

a user system disposed in the volume of space, wherein the user system:

broadcasts a first initiation signal in the volume of space;

receives, in response to the first initiation signal, a first response signal from a first transceiver of the first electrical device, wherein the first response signal comprises a first identification of the first electrical device;

measures at least one parameter associated with the first response signal;

determines a device type of the first electrical device based on the first identification;

determines whether the at least one parameter of the first response signal is within a range of acceptable values; and assigns the first electrical device to a first group based at least on the device type of the first electrical device and when the at least one parameter of the first response signal is determined to be within a range of acceptable values; and a second electrical device disposed within the volume of space, wherein the second electrical device receives a second initiation signal sent by the user system, wherein the user system further:

receives, in response to the second initiation signal, a second response signal from a second transceiver of the second electrical device, wherein the second response signal comprises a second identification of the second electrical device;

measures at least one parameter associated with the second response signal;

determines a device type of the second electrical device based on the second identification;

determines whether the at least one parameter of the second response signal is within a range of acceptable values; and assigns the second electrical device to a second group based at least on the device type of the second electrical device and when the at least one parameter of the second response signal is determined to be within the range of acceptable values.

16. A device for assigning light fixtures to a group, the device comprising:

a user interface; and a controller communicably coupled to the user interface, wherein the controller is configured to:

broadcast a first initiation signal in the volume of space;

receive, in response to the first initiation signal, a first response signal from a first light fixture, wherein the first response signal comprises an identification of the first light fixture;

measure at least one parameter associated with each of the first response signal;

determine whether the at least one parameter of each of the first response signal is within a range of acceptable values;

determine a fixture type of the first light fixture based on the identification of the first light fixture;

assign the first light fixture to a first group based at least on the fixture type of the first light fixture and when the at least one parameter of the first response signal sent by the first light fixture is determined to be within a range of acceptable values;

receive, in response to the first initiation signal, a second response signal from a second light fixture, wherein the second response signal comprises a second identification of the second light fixture;

measure at least one parameter associated with the second response signal;

determine a device type of the second light fixture based on the second identification;

determine whether the at least one parameter of the second response signal is within a range of acceptable values; and assign the second light fixture to the first group based at least on the device type of the second light fixture and when the at least one parameter of the second response signal is determined to be within the range of acceptable values.

17. The device of claim 16, wherein the user interface is part of a user device comprising software for establishing the first group.

18. The device of claim 17, wherein the controller is part of a gateway in communication with the user interface.

19. The device of claim 17, wherein the controller is further configured to allow for subsequent removal of one of the first or second light fixtures from the first group.

* * * * *